United States Patent [19]

Kaneuchi et al.

[11] Patent Number: 4,945,557
[45] Date of Patent: Jul. 31, 1990

[54] VOICE ACTIVATED DIALING APPARATUS

[75] Inventors: Kunihiro Kaneuchi; Toshiki Kawamoto; Tomofumi Nakatani, all of Yokohama, Japan

[73] Assignee: Ricoh Company, Ltd., Japan

[21] Appl. No.: 333,698

[22] Filed: Apr. 5, 1989

Related U.S. Application Data

[62] Division of Ser. No. 203,825, Jun. 8, 1988, abandoned.

[30] Foreign Application Priority Data

| Jun. 8, 1987 | [JP] | Japan | 62-143667 |
| Jun. 8, 1987 | [JP] | Japan | 62-143668 |
| Jun. 8, 1987 | [JP] | Japan | 62-143669 |
| Jun. 8, 1987 | [JP] | Japan | 62-143670 |
| Jun. 8, 1987 | [JP] | Japan | 62-143671 |
| Jun. 8, 1987 | [JP] | Japan | 62-143673 |
| Jun. 12, 1987 | [JP] | Japan | 62-147610 |
| May 20, 1988 | [JP] | Japan | 63-124738 |

[51] Int. Cl.$^5$ .................... H04M 1/27; H04M 1/56
[52] U.S. Cl. ........................ 379/67; 379/88; 379/354
[58] Field of Search ............ 379/88, 89, 67, 355, 379/354, 357, 360, 58, 59, 63, 216; 381/42, 43

[56] References Cited

U.S. PATENT DOCUMENTS

| 3,925,622 | 12/1975 | Robinson | 379/40 |
| 4,491,689 | 1/1985 | Boeckmann | 379/395 |
| 4,644,107 | 2/1987 | Clowes et al. | 379/354 |
| 4,653,097 | 3/1987 | Watanabe et al. | 381/42 |
| 4,731,811 | 3/1988 | Dubus | 379/58 |
| 4,737,976 | 4/1988 | Borth et al. | 379/58 |
| 4,748,654 | 5/1988 | Gray | 379/40 |
| 4,797,910 | 1/1989 | Daudelin | 379/67 |

FOREIGN PATENT DOCUMENTS

| 0238752 | 10/1988 | Japan | 379/88 |
| 974850 | 11/1964 | United Kingdom | 379/88 |

Primary Examiner—Thomas W. Brown
Attorney, Agent, or Firm—Mason, Fenwick, Lawrence

[57] ABSTRACT

An automatic dialing apparatus for use in a telepone or facsimile machine sends out a dial signal to an external network automatically. A detachable telephone number memory, which stores a telephone number together with an area code, is detachably mounted on a telephone unit which includes a memory storing an area code of the district in which the telephone unit is located. The area code of the telepone number data supplied from the telephone number memory is deleted if that area code agrees with the area code stored in the memory of the telephone unit. An automatic dialing apparatus is preferably constructed to carry out dialing automatically responsive to a voice. In the preferred embodiment of such a voice activated dialing apparatus, a telephone number is input through a keyboard and a corresponding identifier, typically the name of a subscriber, is voiced and its voice signal is stored in association with the telephone number.

17 Claims, 16 Drawing Sheets

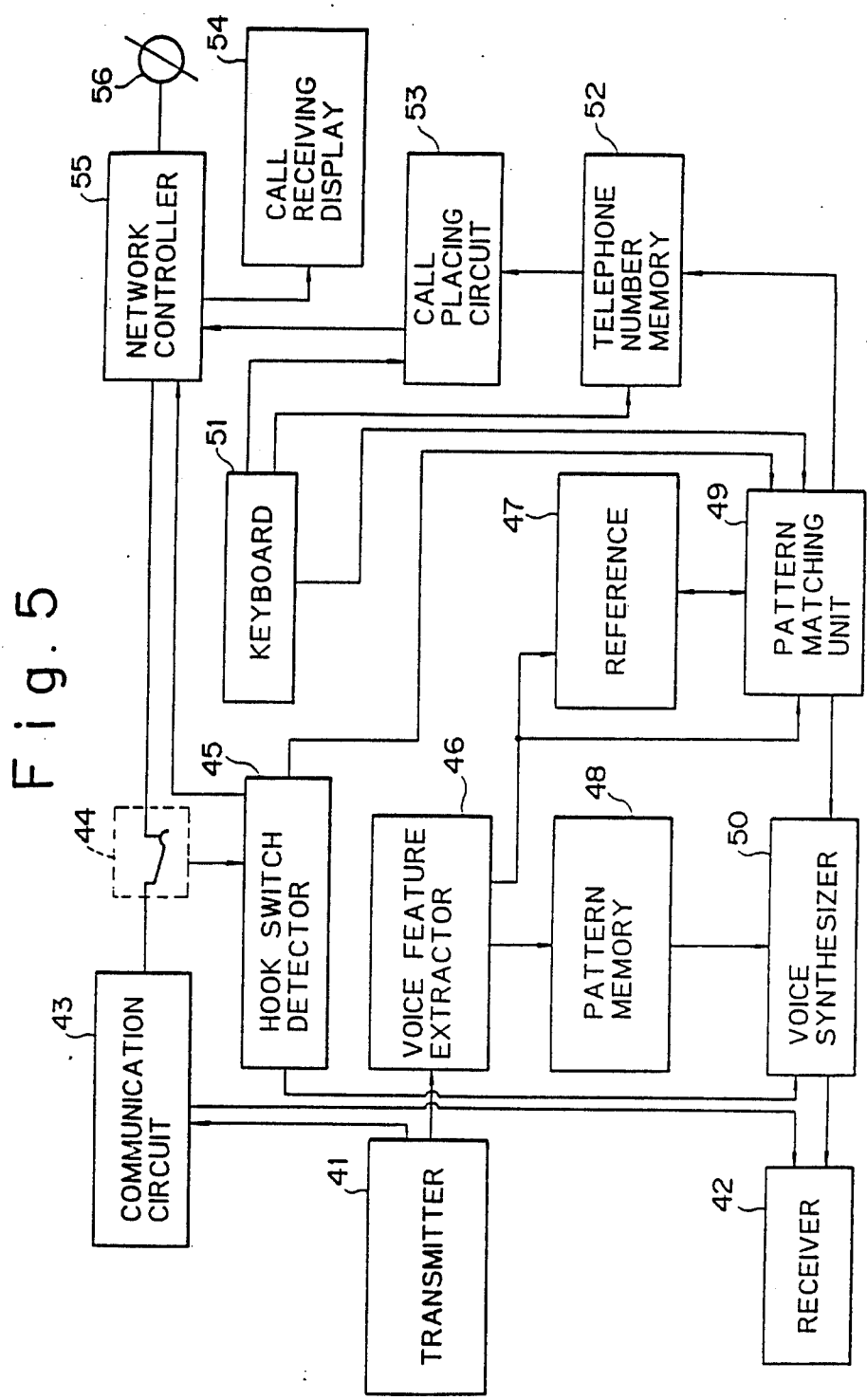

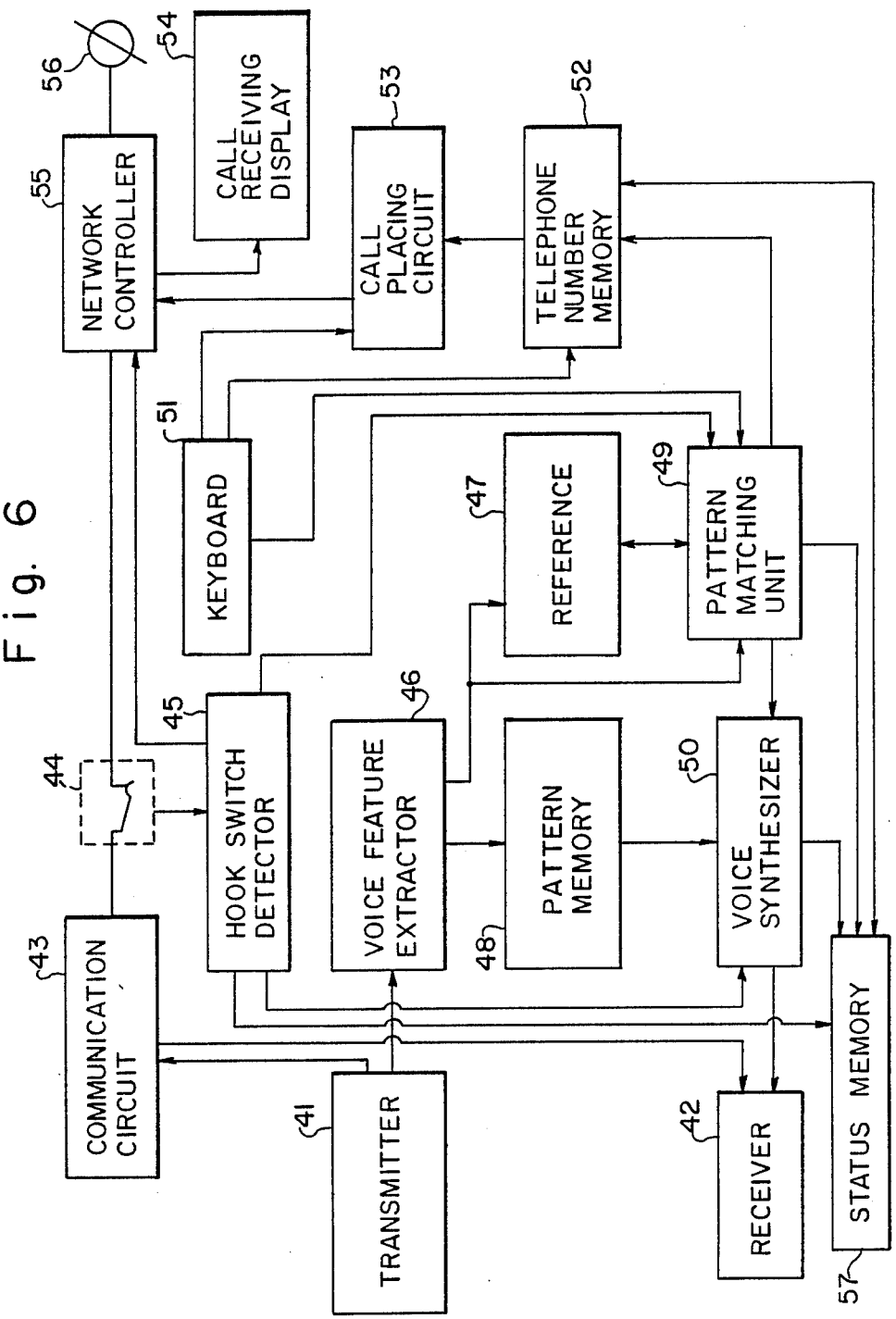

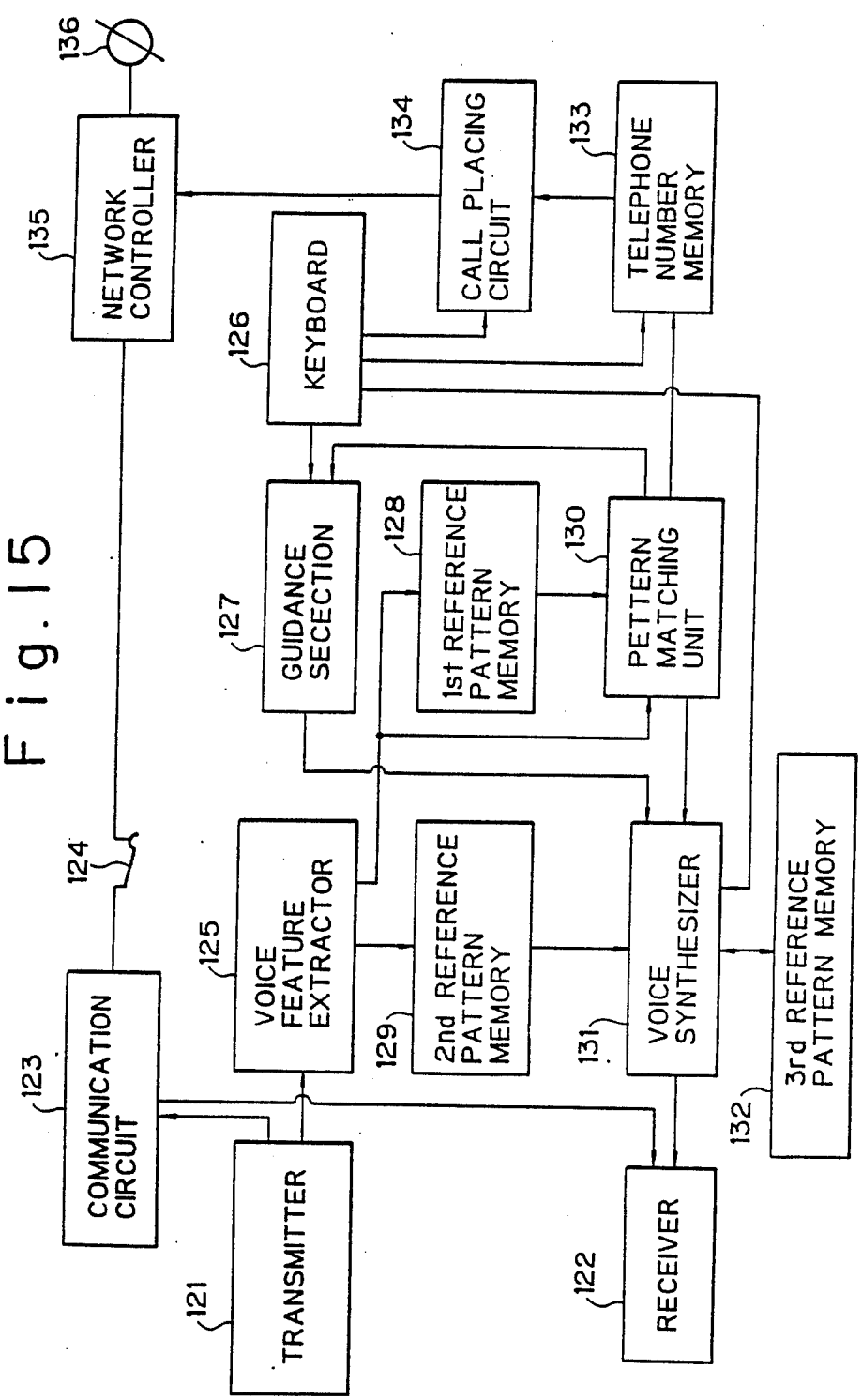

VOICE ACTIVATED DIALING APPARATUS

This application is a division of application Ser. No. 203,825 filed June 8, 1988, now abandoned.

BACKGROUND OF THE INVENTION

1. Field of the Invention

This invention generally relates to an automatic dialing apparatus for automatically dialing a telephone number for use in a telephone or a facsimile machine, and in particular to a voice activated dialing apparatus for automatically dialing a telephone number in response to a voice input.

2. Description of the Prior Art

Now, a push-button telephone is wide spread and a modern push-button telephone is equipped with numerous functions. Such a modern push-button telephone includes a dialing apparatus which is provided with various simplified dialing functions, such as abbreviated telephone number dialing and one-push button dialing, which allow to carry out dialing without inputting each one of the digits of a telephone number of a call receiver. However, such simplified dialing functions can only be used with a telephone unit in which simplified procedures have been appropriately registered. Thus, if one desires to place a call to the same destination from another telephone in which simplified procedures have not been registered or one wishes to place a call from a pay telephone, one has to dial every and each one of the digits of the telephone number of a call receiver Thus, even if there are several telephones in an office or a factory, the same simplified procedures must be registered in each and every one of the telephones, which is cumbersome.

It is conceivable to provide a telephone memory capable of storing simplified dialing procedures, such as an abbreviated dialing procedure, separate from and detachably mountable on a telephone unit. In this case, one can carry such a telephone memory and thus may use the abbreviated dialing function at any place as long as there is a telephone unit to which the telephone memory may be connected. However, in this method, if one carrying such a telephone memory goes out of a certain district where the same area code applies, there arises a problem. For example, suppose that one registers a telephone number of "333-3333" in a telephone memory using the abbreviated dialing function in the Yokohama district whose area code is "045." As long as, this telephone memory is used within the Yokohama district, no problem arises because it is not necessary to use the area code "045" before the telephone number of "333-3333" and thus it is only necessary to input the corresponding abbreviated number, e.g., "*33", for the telephone number "333-3333." However, if the owner of this telephone memory goes to Tokyo where the area code of "03" applies and uses the same telephone memory for placing a call to "333-3333" using the registered abbreviated number, a call is placed to "333-3333" in Tokyo and not in Yokohama because the area code is not included in this example. On the other hand, if a telephone number is registered together with an area code, such as 045-333-3333 in the above-described example, then the corresponding abbreviated number can only be used outside of the Yokohama district and it cannot be used in the Yokohama district, which is inconvenient.

In a prior art telephone dialing apparatus, when a call is to be placed, a caller is required to manually dial or push buttons for each and every one of the digits of the telephone number of a call receiver. In such a case, a caller is often required to temporarily memorize the telephone number of a call receiver and jot it down on a piece of paper, which is cumbersome. Under the circumstances, there is proposed an automatic dialing system which automatically carries out dialing in response to voice input of a caller as disclosed in the Japanese Patent Laid-open Publication No. 61-144157. In accordance with the invention disclosed in this publication, it is not necessary for a caller to try to temporarily memorize or jot down the telephone number of a call receiver. However, as the number of registered telephone numbers increases, it arises a situation in which one cannot be sure whether a certain telephone number is registered and how it is registered. Even if one remembers the registered data well, the tone of voice may vary from time to time for various reasons, such as having a cold and aging, which could cause erroneous voice recognition, leading to dialing of a wrong telephone number. In such a voice activated dialing apparatus, there is a case in which the registered data is read out, deleted and/or altered other than being used for dialing. In particular, in the case when the registered data is to be altered, there are several possibilities, such as altering only a library for voice recognition, altering only a library for response, altering both of recognition and response libraries at the same time and altering only the dial number.

In addition, in a voice activated dialing apparatus, it is necessary to form and store voice reference patterns to be later used for pattern matching in voice recognition. Such an operation for registering voice reference patterns has nothing to do with the inherent function of a telephone unit, and a call may be received in the middle of such a voice registration operation. It may be so structured to send a busy signal to the caller while the voice registration operation is in progress; however, in such a method, the operator cannot recognize the fact that a call is being received. In addition, since the off-hook condition continues for some time without communication, an associate telephone exchange machine may determine that the handset has been misplaced. If the line has been left connected for a long period of time, dialing cannot be carried out unless the line is left disconnected for 10 seconds or more.

When any modification or alteration of the registered data is to be carried out in such a voice activated dialing apparatus, it is almost impossible to remember all of the operational procedures. Thus, the operator normally consults with a manual in effecting modification or alteration of the registered data. As an alternative approach, as disclosed in the Japanese Patent Laid-open Publication No. 56-53501, a verbal guidance may be provided in effecting modifications or alterations. However, the invention disclosed in this publication is not responsive to the voice of the operator.

SUMMARY OF THE INVENTION

In accordance with one aspect of the present invention, there is provided an automatic dialing apparatus for use with a telephone unit, which automatically dials a telephone number after checking whether or not an area code is necessary in response to an abbreviated number.

In accordance with another aspect of the present invention, there is provided a voice activated dialing apparatus which carries out dialing of a selected telephone number automatically in response to a voice input.

It is therefore a primary object of the present invention to obviate the disadvantages of the prior art as described above and to provide an improved automatic dialing apparatus suitable for use in a telephone unit, a facsimile machine or the like.

Another object of the present invention is to provide an improved automatic dialing apparatus capable of automatically placing a call to an intended destination using an abbreviated number even if an area code or any other code is required depending on the place from which a call is placed.

A further object of the present invention is to provide an improved voice activated dialing apparatus suitable for use in a telephone unit, a facsimile machine or the like, which carries out dialing automatically in response to any desired predetermined voice input.

A still further object of the present invention is to provide an improved voice activated dialing apparatus suitable for use in a telephone unit, a facsimile machine or the like, which allows to receive a call even if any other operation other than telephone communication is in progress.

A still further object of the present invention is to provide an improved voice activated dialing apparatus capable of storing and reproducing telephone communication.

A still further object of the present invention is to provide a communication information recording and reproducing method particularly suitable for use in a voice activated dialing apparatus.

A still further object of the present invention is to provide an improved voice activated automatic dialing apparatus having an excellent voice recognition characteristic.

A still further object of the present invention is to provide an improved voice activated automatic dialing apparatus easy in voice registration operation.

A still further object of the present invention is to provide an improved voice activated automatic dialing apparatus which permits the user to select whether or not an operational guidance is to be output as a voice output.

Other objects, advantages and novel features of the present invention will become apparent from the following detailed description of the invention when considered in conjunction with the accompanying drawings.

BRIEF DESCRIPTION OF THE DRAWINGS

FIG. 5 is a block diagram showing a voice activated automatic telephone number dialing apparatus capable of dialing a telephone number in response to a voice input of its subscriber's name;

FIG. 6 is a block diagram showing a voice activated automatic telephone number dialing apparatus which is a modification of the apparatus shown in FIG. 5;

FIG. 15 is a block diagram showing a voice activated automatic telephone number dialing apparatus having a verbal guidance outputting function constructed in accordance with a still further embodiment of the present invention.

DESCRIPTION OF THE PREFERRED EMBODIMENTS

Figure 1:
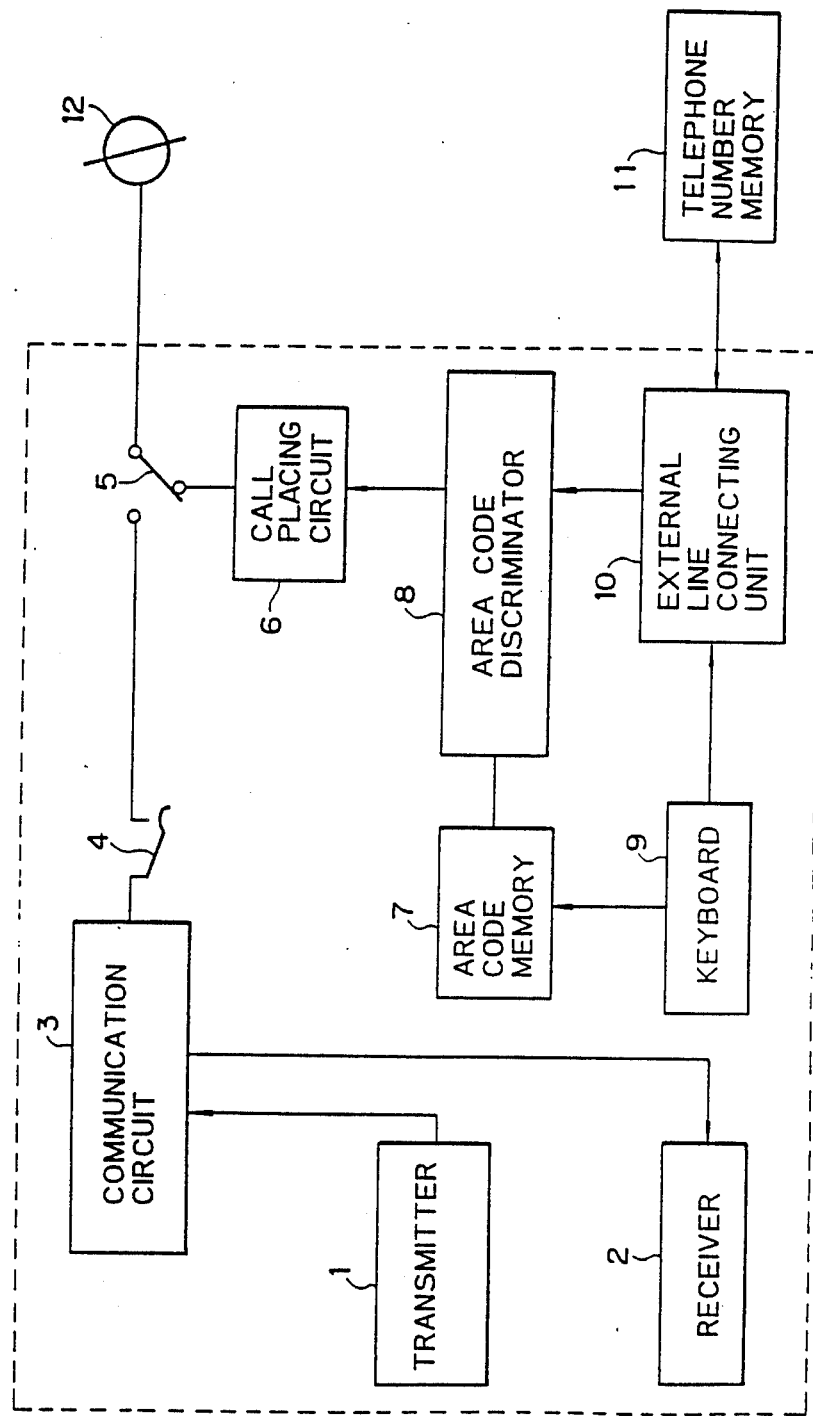
FIG. 1 is a block diagram showing an automatic telephone number dialing apparatus for dialing a telephone number with or without an area code constructed in accordance with one embodiment of the present invention.

Referring now to FIG. 1, there is shown in block form an automatic telephone number dialing apparatus constructed in accordance with one embodiment of the present invention. As shown, the present automatic telephone number dialing apparatus includes a transmitter 1, a receiver 2, a communication circuit 3, a hook switch 4, a turn-over switch 5, a call placing circuit 6, an area code memory 7, an area code discriminator 8, a keyboard 9, an external line connecting unit 10, and a telephone number memory 11. As well known in the art, the present automatic telephone number dialing apparatus may be incorporated in a telephone unit. And, the transmitter 1 and the receiver 2 are normally built in a handset of a telephone unit. In the illustrated embodiment, those elements which are located inside of the dotted line defining a square define a telephone unit. The telephone number memory 11 is detachably mounted on a telephone unit such that it may be connected to or disconnected from the associated external line connecting unit 10 of a telephone unit. The telephone number memory 11 may be comprised of any information storing unit, such as a semiconductor memory. In addition, the telephone unit is coupled to a telephone network or external (extension) line 12. In the illustrated embodiment, it is so structured that the turn-over switch 5 is normally connected to the call placing circuit 6 except when a telephone number dialing operation has been completed and when a call has been received. In addition, in the illustrated embodiment, use is made of a keyboard 9 as a data input unit; however, use may be made of any other data input unit, such as voice input unit, in which case a dialing operation may be initiated in response to a voice input.

In operation, when the telephone unit which is the part surrounded by the dotted line has been installed at a desired location, the area code of the district in which the telephone unit is located is first input into the area code memory 7 through the keyboard 9 to have the area code registered. For example, if the district in which the present telephone unit has been installed is Yokohama, the area code of "045" is input through the keyboard 9 to have its area code registered in the area code memory 7. As an alternative structure, such an area code may be set and registered by using dip switches, if desired. Then, a telephone number of interest and its associated abbreviated number or a special key are registered in the telephone number memory 11. The special key here indicates a push button of a push-button telephone or a letter key of a letter key registration system in which a data is input as a combination of letters, such as English alphabets or Japanese katakana In the case where voice input is used, voice patterns are registered instead of abbreviated numbers. In the present embodiment, an abbreviated number corresponding to a telephone number of interest is registered.

In accordance with the principle of this aspect of the present invention, when registering a telephone number of interest in the telephone number memory 11, the telephone number of interest is registered together with the area code of the district to which the telephone number of interest belongs. For example, if a telephone number of "333-3333" in the Yokohama district, whose area code is "045", is to be registered in accordance with the principle of this aspect of the present invention, the telephone number preceded by the area code, i.e. "045-333-3333" is input and registered in the telephone number memory 11. Of course, an abbreviated number, such as "*33", associated with this telephone number of interest must be input in accordance with a predetermined abbreviated number registration procedure. Such an abbreviated number may be stored in the external line connecting unit 10 or any other desired memory.

It will now be described the case when dialing of a selected telephone number is to be carried out using an associated abbreviated number in the apparatus shown in FIG. 1. In the first place, an abbreviated number is input into the present dialing apparatus through the keyboard 9. In response to this abbreviated number thus input, the external line connecting unit 10 reads out the corresponding telephone number from the telephone number memory 11 and supplies the telephone number thus read out to the area code discriminator 8. As described before, a telephone number stored in the telephone number memory 11 is a telephone number preceded by an area code associated therewith, so that the telephone number read from the telephone number memory 11 and supplied to the area code discriminator 8 also has an associated area code. On the other hand, the area code memory 7 stores the area code of the district in which the present telephone unit is located and this area code information stored in the area code memory 7 is also supplied to the area code discriminator 8.

Thus, at the area code discriminator 8, the area code of the telephone number supplied from the telephone number memory 11 is compared with the area code supplied from the area code memory 7, and if both of the area codes are identical, the area code discriminator 8 removes the area code from the telephone number supplied from the telephone number memory 11 and supplies the telephone number without an area code to the call placing circuit 6, which, in turn, sends out a calling signal to the network 12. On the other hand, if there is a lack of agreement between the two area codes, the area code discriminator 8 supplies the telephone number preceded by the area code supplied from the telephone number memory 11 to the call placing circuit 6 as it is. This is because, if the two area codes agree, it means that the telephone number retrieved from the telephone number memory 11 belongs to the same district as that of the present telephone unit, so that the area code should be removed from the telephone number retrieved from the telephone number memory 11 before being supplied to the call placing circuit 6. On the other hand, if the two area codes do not agree, since it means that the telephone number retrieved from the telephone number memory 11 belongs to a district other than the district in which the present telephone unit is located, and thus the telephone number with the area code as retrieved from the telephone number memory 11 must be supplied to the call placing circuit 6 without change.

Figure 2:
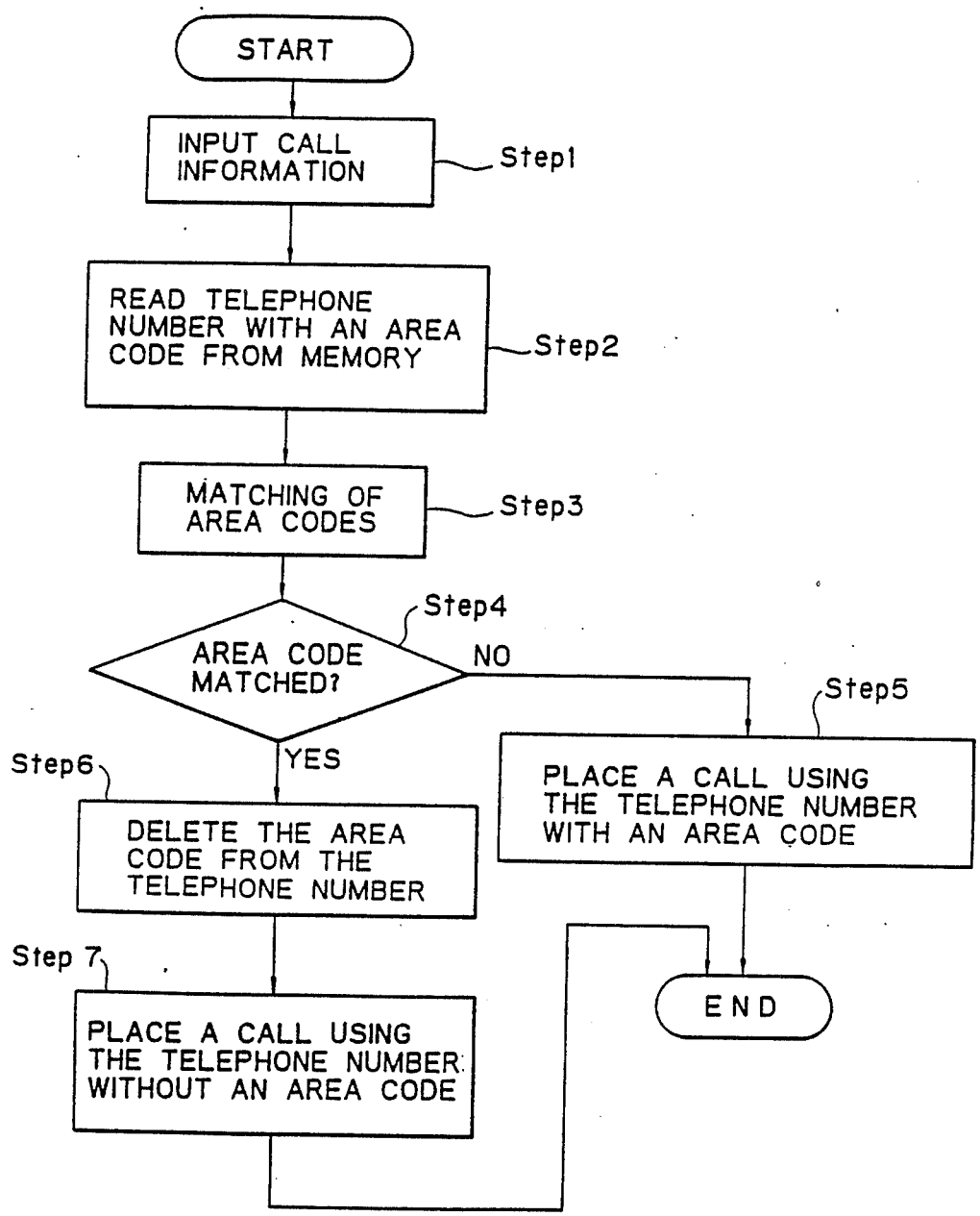
FIG. 2 is a flow chart which is useful for understanding the operation of the automatic telephone number dialing apparatus shown in FIG. 1.

A dialing process in accordance with one embodiment of this aspect of the present invention is illustrated in FIG. 2. As shown, in step 1, call information, such as an abbreviated number or code for a telephone number of interest, is input into the present automatic dialing apparatus. Then, in step 2, in response to such an abbreviated number, a corresponding telephone number preceded by an associated area code is retrieved from the telephone number memory 11 by the external line connecting circuit 10. Then, the telephone number with an area code thus read out from the telephone number memory 11 is transferred to the area code discriminator 8 where the area code of this telephone number is compared with the area code stored in the area code memory 7 at steps 3 and 4. If the two area codes are identical, the area code is removed from the telephone number by the area code discriminator 8 at step 6 and then a call is placed by the call placing circuit 6 using the telephone number without an area code at step 7. On the other hand, if the two area codes disagree at step 4, the telephone number with an area code is supplied to the call placing circuit 6 whereby a call signal is output from the call placing circuit 6 based on the telephone number with an area code.

As described above, in accordance with this aspect of the present invention, it is so structured that the area code of a district in which a telephone is installed is registered in the telephone and each of telephone numbers of interest is registered in a detachable telephone number memory together with its associated area code. Typically, a user also registers an abbreviated number for each of the telephone numbers of interest. With this structure, the user may use the same abbreviated number and does not need to pay attention to the area code of the district in which he or she is in. In the above-described embodiment, the area code has been used as a code to identify a particular district, such as Yokohama and Tokyo. However, such an area code should not be limited only to a district, and it may be extended to a state code or a country code, if any.

Figure 3:
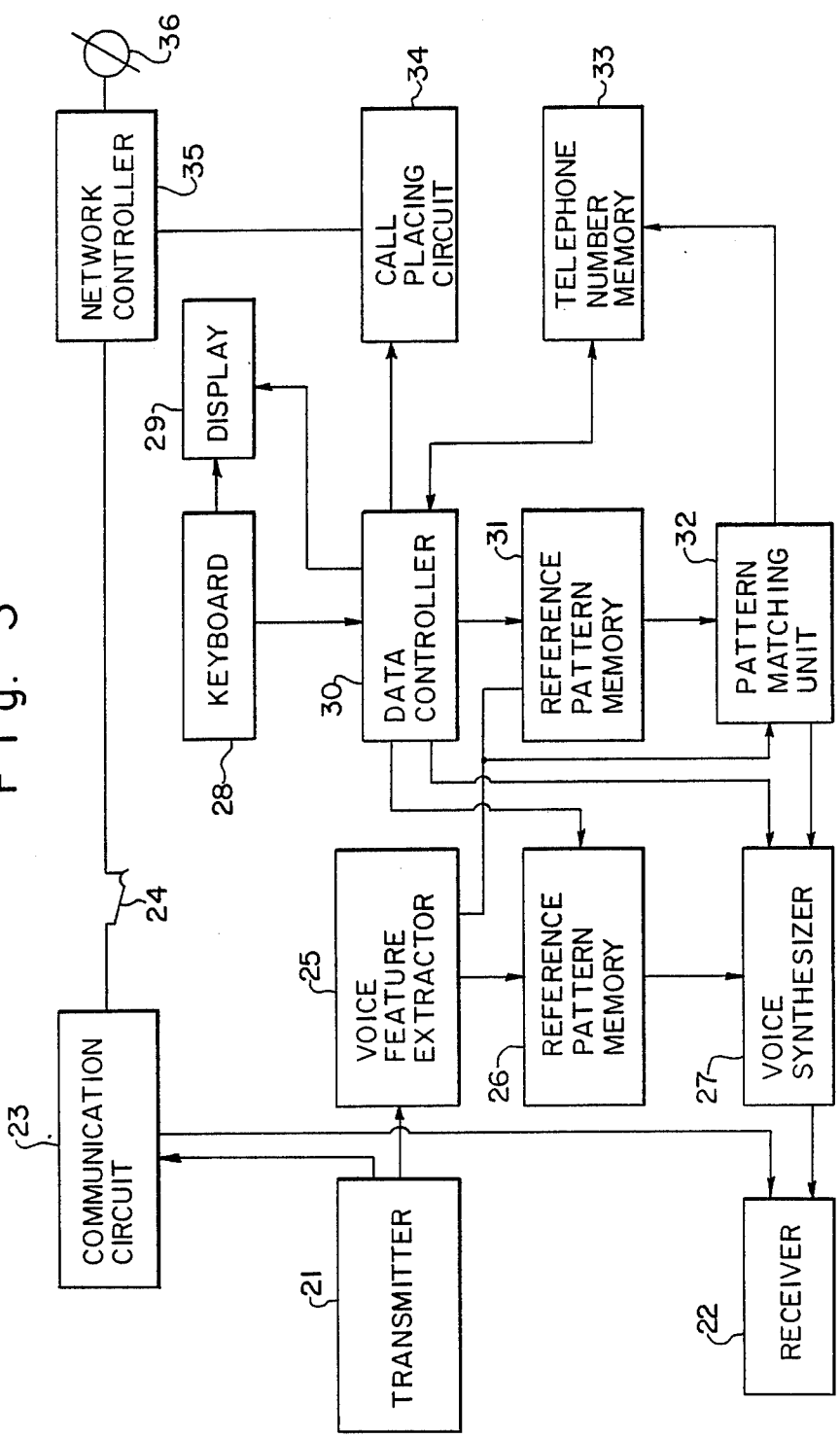
FIG. 3 is a block diagram showing a voice activated automatic telephone number dialing apparatus constructed in accordance with another embodiment of the present invention.

Referring now to FIG. 3, there is shown in block form a voice activated automatic telephone number dialing apparatus constructed in accordance with another embodiment of the present invention. As shown, the present apparatus includes a transmitter 21, a receiver 22, a communication circuit 23, a hook switch 24, a voice feature extractor 25, a reference pattern memory 26 for voice synthesis, a voice synthesizer 27, a keyboard 28, a display 29, a data controller 30, a reference pattern memory 31 for voice recognition, a pattern matching unit 32, a telephone number memory 33, a call placing circuit 34 and a network controller 35, which is connected to a telephone network 36. In the illustrated embodiment, two kinds of reference patterns, i.e., one for voice synthesis and the other for voice recognition, are provided; however, alternatively, common reference patterns for both of voice synthesis and voice recognition may be provided, if desired It is to be noted that any scheme for voice feature extraction, voice recognition and voice synthesis may be used in the present apparatus. In addition, there may be provided a common library for voice recognition and voice synthesis (voice response).

In operation, a library of voice reference patterns for voice recognition, a library of voice reference patterns for voice response (voice synthesis) and a list of telephone (dial) numbers of interest associated therewith are previously stored in the memories 26, 31 and 33 of the present apparatus. Any voice recognition and voice synthesis techniques as disclosed in the Japanese Patent Laid-open Publication No 61-144157 may be used in the present invention. Of importance, in accordance with this aspect of the present invention, when a collection of telephone numbers of interest is to be registered, the telephone numbers of interest are divided into a plurality of groups, for example, depending on the first letter of a subscriber's name. For example, those names which start with one of letters "a" through "e", such as Ackerman, Beresford, Crown, Dooley and Eaton, are classified into the first group, those names which start with one of letters "f" through "j" are classified into the second group, and so on. Such a classification is particularly important when retrieving a desired telephone number from a voluminous list, as will become clear later.

In accordance with this aspect of the present invention, a telephone number of interest is registered in the telephone number memory 33 and a particular voice or pronunciation of any desired word, phrase or sentence associated with the telephone number is registered in the form of a voice pattern in each of the voice reference pattern memories 26 and 31. For example, suppose that Mr. Smith lives in the district of Yokohama and he has a telephone whose number is "333-3333." In this case, for example, the telephone number "333-3333" is registered in the telephone number memory 33 and its associated identifier, such as "Smith of Yokohama" or simply "Smith" if there is only one, is pronounced and its voice pattern is registered in each of the voice reference pattern memories 26 and 31 in relation to the telephone number "333-3333." Thus, when the user pronounces "Smith of Yokohama", the present apparatus will retrieve the telephone number "333-3333" from the telephone number memory 33, which is then supplied to the call placing unit 34 to send out a calling signal to the network 36.

The operation of the apparatus shown in FIG. 3 will now be described more in detail with reference to FIGS. 4a and 4b. In FIG. 4b, a sub-flow A is a sequence of steps for reading out a dial or telephone number from the telephone number memory 33 and placing a call to that telephone number thus read out. A sub-flow B is a sequence of steps for altering only a registered voice reference pattern for voice recognition. A sub-flow C is a sequence of steps for altering only a registered voice reference pattern for voice response A sub-flow D is a sequence of steps for simultaneously altering registered voice reference patterns for both of voice recognition and voice response A sub-flow E is a sequence of steps for altering a registered telephone number. A sub-flow F is a sequence of steps for deleting all of the registered data of a particular identifier.

Figure 4A:
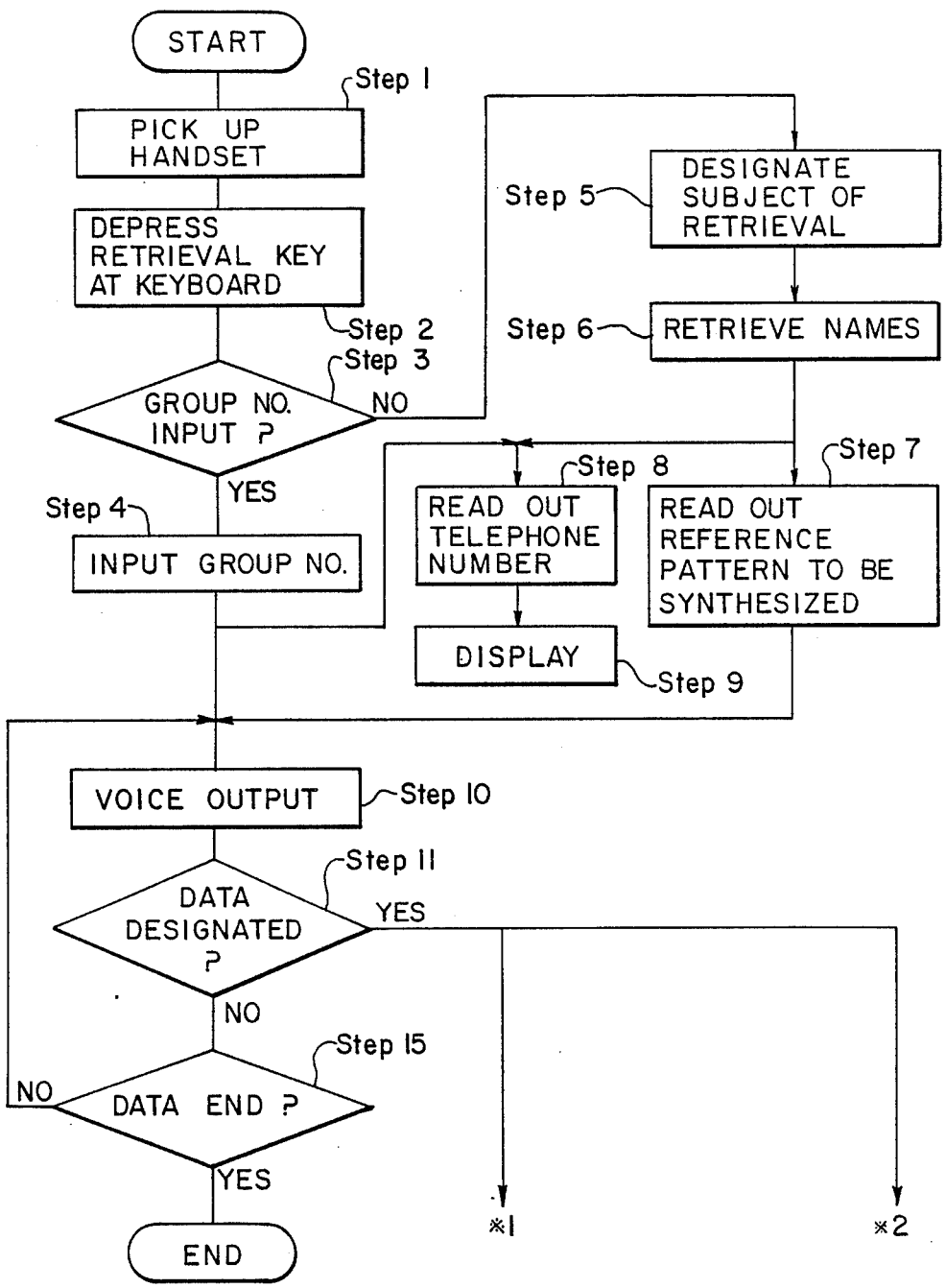
FIGS. 4a and 4b define a flow chart which is useful for understanding the operation of the apparatus shown in FIG. 3.
Figure 4B:
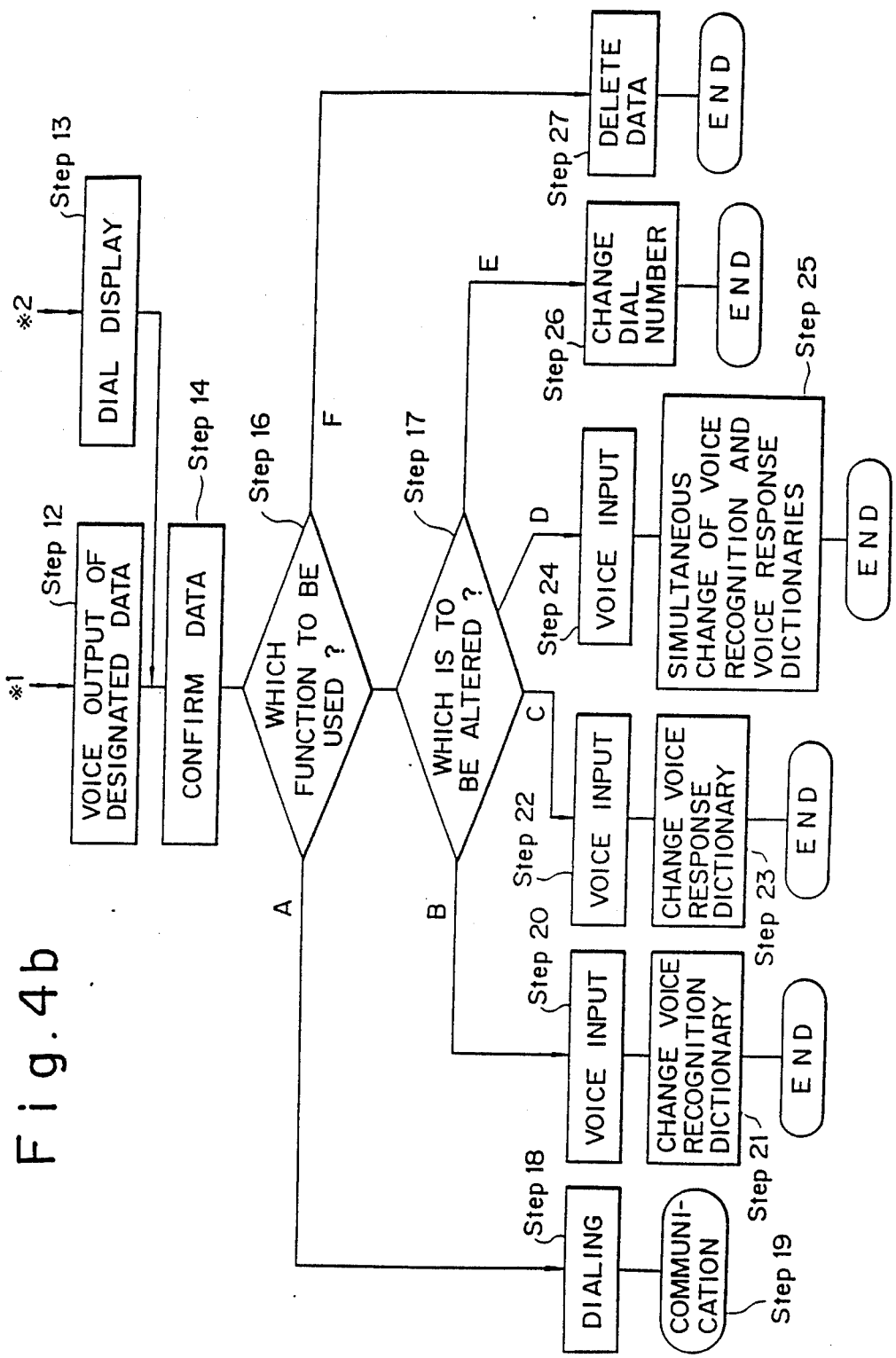

In the flow chart shown in FIGS. 4a and 4b, in the first place, a handset, including at least the transmitter 21 and the receiver 22, of the present apparatus shown in FIG. 3 is picked up at step 1. Then, at step 2, through a key input at the keyboard 28, a retrieval mode is established. Alternatively, it may also be so structured to establish a retrieval mode by a voice input. Then, if the user knows a particular registered group number, it is input through the keyboard 28 at steps 3 and 4. If no particular group number has been designated at step 3, then all of the registered identifiers, typically subscriber's names, are subject to retrieval. Then, it proceeds to step 5 where the user designates a particular identifier as a subject to be retrieved. For example, if the user wishes to retrieve "Smith" which is registered in the form of a voice pattern in association with the Smith's telephone number, then the user pronunciates "Smith" to the transmitter 21. In response to this voice input of "Smith", the data controller 30 scans through the collection of registered identifiers (typically, names of subscribers) to select candidates at step 6.

Then, the voice synthesizer 27 reads out a voice reference pattern for voice synthesis from the voice reference pattern memory 26 corresponding to a selected candidate identifier at step 7 and the thus read out voice pattern is supplied to the receiver 22 to produce a voice output at step 10. At the same time, under the control of the data controller 30, the telephone number corresponding to the selected candidate identifier is read out of the telephone number memory 33 at step 8 and displayed at the display 29 at step 9. In this manner, selected candidate identifiers or typically subscribers' names are output in the form of synthesized voice, together with the corresponding telephone number which is displayed at the display 29, one after another. When the user has found the desired identifier (subscriber's name) and its corresponding telephone number, the user executes a key input operation at the keyboard 28 to designate or select the particular data a step 11. In this case, as an alternative method, it may also be so structured that the designation of a particular data is carried out by a voice input.

The thus designated particular data is again output with its identifier in the form of a voice output at step 12 and its telephone number in the form of a visual display at step 13 so as to have the user confirm that the user has selected the data he or she wanted at step 14. Upon confirmation of the data, the user then selects a particular function to be applied to the thus selected data using the keyboard 28 at step 16. If a call placing function with the thus selected data is to be selected, it proceeds to step 18 to carry out a call placing operation using the telephone number thus selected. On the other hand, after confirmation of the data at step 14, if a function for altering the registered voice reference pattern for voice recognition (sub-flow B) has been selected, a new voice is input at step 20 and the voice pattern of this new voice is registered in the voice reference pattern memory 31 at step 21. This may be advantageous, for example, in the case where the old registration of voice pattern for "Smith" is to be changed to "Smith of Yokohama" so as to make distinctions from "Smith of Tokyo" which is to be registered newly. Furthermore, after confirmation of the data at step 14, if a function for altering the registered voice reference pattern for voice response (sub-flow C) has been selected, a new voice is input into the transmitter 21 at step 22 and the voice pattern of this new voice is registered in the voice reference pattern memory 26 for voice response at step 23. In this manner, the voice response pattern library may be modified or altered. On the other hand, after confirmation of the data at step 14, if a function for simultaneous alteration of voice recognition and voice response reference patterns (sub-flow D) has been selected, a new voice is input into the transmitter 21 at step 24 and the voice pattern of this new voice is registered in both of the voice reference pattern memories 26 and 31 at the same time at step 25. Moreover, after confirmation of the data at step 14, if a function for altering the registered telephone number (sub-flow E) has been selected, a new telephone number is input to thereby change the registered telephone number at step 26. In addition, after confirmation of the data at step 14, if a function for deleting a data (sub-flow F) has been selected, all of the associated data, including the telephone number, voice reference pattern for voice recognition and voice reference pattern for voice response, are deleted at step 27.

As described above, in accordance with this aspect of the present invention, the retrieved data is once checked before being used for placing a call so that a voice activated dialing operation can be carried out at high accuracy. Furthermore, the registered data may be partly or wholly altered or renewed and thus the registered data may be accumulated successively.

Referring now to FIG. 5, there is shown in block form a voice activated automatic telephone number dialing apparatus constructed in accordance with a further embodiment of the present invention. FIG. 6 shows a voice activated dialing apparatus which is a modification of the apparatus shown in FIG. 5 and thus similar in many respects to the apparatus shown in Fig. 5. As shown in FIG. 5, the present voice activated dialing apparatus includes a transmitter 41, a receiver 42, a communication circuit 43, a hook switch 44, a hook switch detector 45, a voice feature extractor 46, a voice recognition voice reference pattern memory 47, a voice synthesis voice reference pattern memory 48, a pattern matching unit 49, a voice synthesizer 50, a keyboard 51, a telephone number memory 52, a call placing circuit 53, a call receiving display 54 and a network controller 55. The network controller 55 is connected to an external telephone network 56. When a voice, such as the pronunciation of a particular subscriber's name, to be registered is input into the transmitter 41, which typically defines a handset together with the receiver 42, the feature of the voice input is extracted at the voice feature extractor 46 and is registered in each of the voice reference pattern memories 47 and 48 in the form of a voice pattern. On the other hand, the corresponding telephone number is registered in the telephone number memory 52 in relation to the associated voice. The pattern matching unit 49 compares a voice pattern of an input voice from the transmitter 41 with the registered voice patterns in the reference pattern memory 47 to thereby select a corresponding registered voice pattern which is then supplied to the voice synthesizer 50 to produce a voice output. Thus, the operator may confirm that a correct registered voice pattern has been selected by listening to the thus produced voice pattern. At the same time, the telephone number corresponding to the thus selected registed voice pattern is read out of the telephone number memory 52 and supplied to the call placing circuit 53 which in turn outputs a dial signal in response thereto. In the illustrated embodiment, the two voice pattern memories 47 and 48 are separately provided for voice recognition and voice synthesis; however, these may be replaced by a single common voice pattern reference memory, if desired.

Figure 7A:
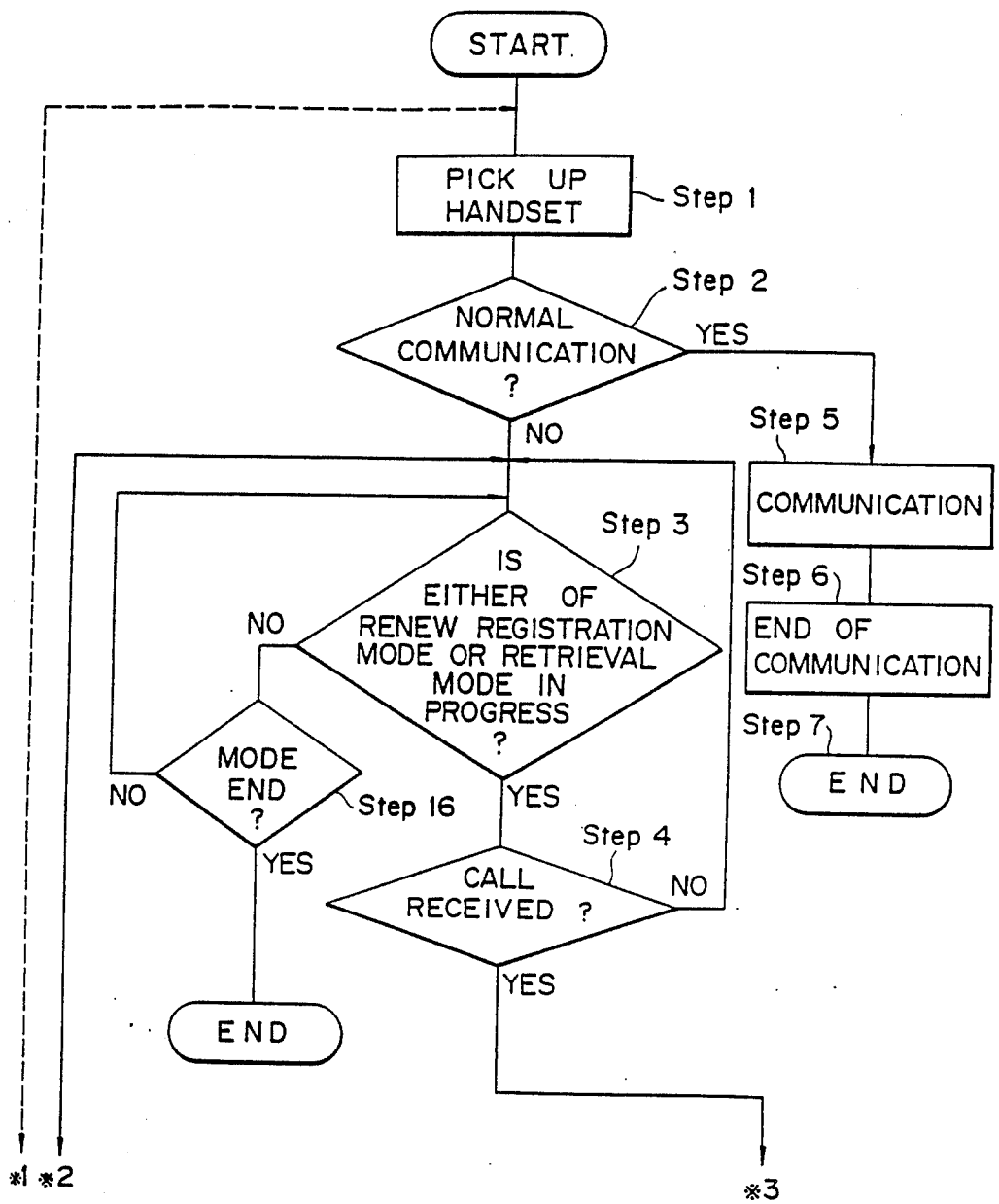
FIGS. 7a and 7b define a flow chart which is useful for understanding the operation of the apparatuses shown in FIGS. 5 and 6.
Figure 7B:
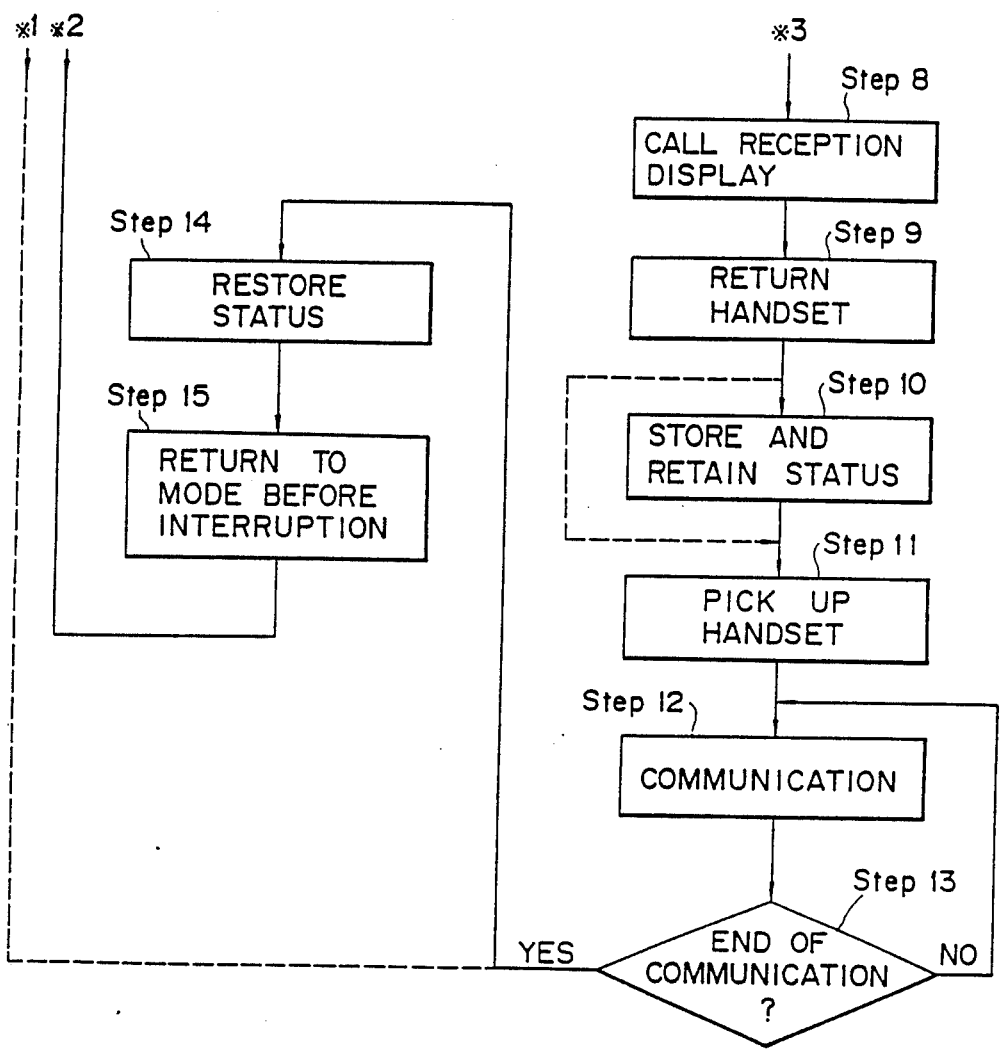

The operation of the apparatus shown in FIG. 5 will now be described with particular reference to FIGS. 7a and 7b. The apparatus of FIG. 5 has basically two modes of operation as in at least some of the other apparatuses described in this specification. That is, the present apparatus has a registration mode, in which telephone numbers and associated voice patterns are registered, and a communication mode in which a communication path is established for carrying out a communication with another telephone by placing or receiving a call. As shown in the flow chart shown in FIGS. 7a and 7b, the user first establishes the registration mode to register telephone numbers of interest and their associated voice patterns as respective identifiers. That is, the user first picks up a handset, which typically includes the transmitter 41 and the receiver 42, at step 1 and operates the keyboard 51 to establish the registration mode. Under this condition, any desired dial or telephone numbers of interest and their associated voice patterns, typically pronunciations of subscribers' names, are registered at step 3. During the registration mode, the network controller 55 keeps the present dialing apparatus disconnected from the network 56. In the above-described embodiment, the registration mode has been established by operating the keyboard 51; however, as an alternative, it may also be so structured that the registration mode is established in response to a particular voice input.

After registering a particular telephone (dial) number and its associated voice pattern, it goes back to the initial state of the registration mode to register the next set of a telephone number and its associated voice pattern. Upon completion of the registration operation, the user is only required to return or hang up the handset. In accordance with an important feature of this aspect of the present invention, it is so structured to permit the operator to temporarily enter into the communication mode when a call has been received during the registration mode. For this purpose, the hook switch detector 45 for detecting the condition of the hook switch 44, which is turned on and off depending on whether the handset has been picked up or in the hang-up position, is provided and an output from the hook switch detector 45 is supplied to the network controller 55 which in turn is connected to the call receiving display. Thus, when a call has been received while the apparatus in the registration mode at step 4 in the flow chart shown in FIGS. 7a and 7b, the fact that a call has been received is displayed at the display 54 at step 8. Thus, the operator may notice that a call has been received even if the operator is in the process of registration. Then, if the operator wishes to temporarily interrupt the registration mode to enter into the communication mode, the operator once returns the handset in position or hangs up at step 9. (In this case, the data which has been input in this sequence of registration operation is lost and not retained.) This is detected by the hook switch detector 45 and its output is supplied to the network controller 55. Because of this, the apparatus is set in a normal call receiving condition and thus the ringer is activated. Thus, the operator picks up the handset once again at step 11 (step 10 is skipped in this embodiment) and this fact is detected by the hook switch detector 45 which supplies its output to the network controller 55. As a result, the network controller 55 establishes a communication path between the present apparatus and the network 56 at step 12. Therefore, a verbal communication can be carried out in the normal telephone communication mode. It is to be noted that the registration mode may be set not only for registering new data but also for renewing, retrieving or altering the already registered data. Upon completion of the normal telephone communication at step 13, it goes back to step 1 following the dotted line.

FIG. 6 illustrates a modified voice activated dialing apparatus which is similar in many respects to the apparatus shown in FIG. 5. As a matter of fact, the apparatus of FIG. 6 differs from the apparatus of FIG. 5 only in the additional provision of a status memory 57. And, thus, like elements are indicated by line numerals between FIGS. 5 and 6. The apparatus of FIG. 6 also allows to temporarily switch to the telephone communication mode from the registration mode when a call has been received while the apparatus is in the registration mode, and as different from the apparatus of FIG. 5, the present apparatus of FIG. 6 allows to automatically restore the registration mode which has been temporarily interrupted upon completion of a telephone communication. That is, in accordance with this embodiment, when the registration is to be temporarily interrupted because of reception of a call, the operator once returns the handset in position at step 9 and then the current status of the registration mode is stored in the status memory 57 at step 10, as shown in the flow chart of FIG. 7b. And, then, when the operator once again picks up the handset at step 11, the normal telephone communication mode is established at step 12. Then, upon completion of a telephone communication at step 13, it goes to step 14 to restore the status to thereby reestablish the registration mode at step 15 with the condition when it has been interrupted. Accordingly, in accordance with the present embodiment, the data which has been input until the occurrence of interruption of the registration mode is saved and may be used later when the registration mode is restored.

As described above, in a voice activated dialing apparatus, a voice data uniquely associated with a particular telephone number is stored in a memory in the form of a voice pattern and the voice pattern thus stored may be read out from the memory and supplied to a voice synthesizer to reproduce the voice. And, the voice activated dialing apparatus normally has two modes of operation, i.e., registration and communication modes, and when a call has been received while the apparatus is in the registration mode, there is only one choice, that is either to interrupt the registration mode or to disregard the call to thereby continue the registration mode. Now, this aspect of the present invention has been made in view of such a circumstance and it allows to record a communication and to reproduce the thus recorded communication later.

Figure 8:
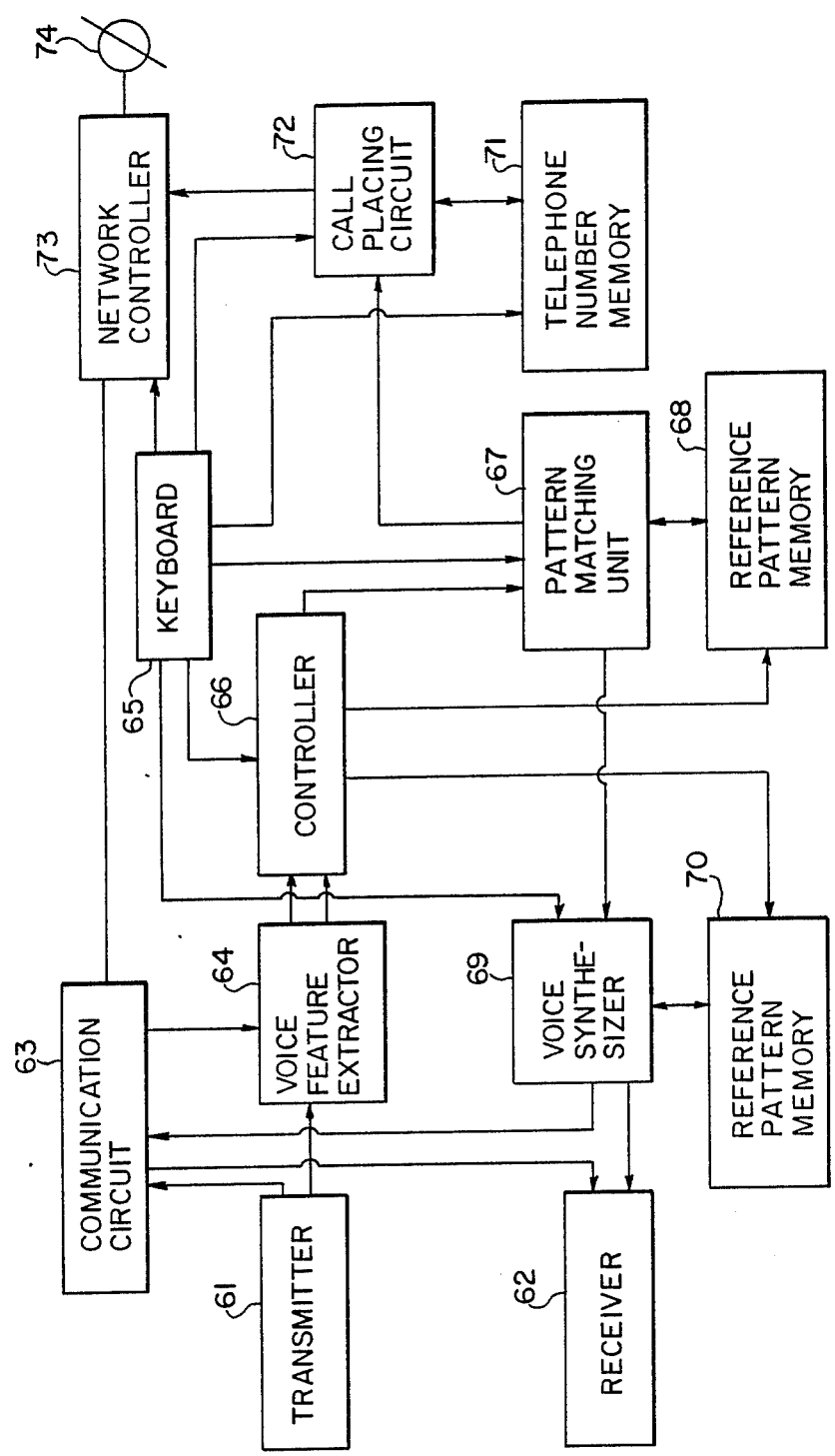
FIG. 8 is a block diagram showing a voice activated automatic telephone number dialing apparatus capable of recording and reproducing the information of telephone communication constructed in accordance with a further embodiment of the present invention.

Referring now to FIG. 8, there is shown in block form a voice activated dialing apparatus constructed in accordance with a still further embodiment of the present invention. As shown, the present apparatus includes a transmitter 61, a receiver 62, a communication circuit 63, a voice feature extractor 64, a keyboard 65, a controller 66, a pattern matching unit 67, a voice recognition voice reference pattern memory 68, a voice synthesizer 69, a voice synthesis voice reference pattern memory 70, a telephone (dial) number memory 71, a call placing circuit 72, and a network controller 73. Similarly as described before, the transmitter 61 and the receiver 62 are both typically incorporated in a handset, and the network controller 73 is connected to an external line or network 74 to control the connection condition between the present apparatus and the network 74. The present apparatus may be set in a registration mode by operating the keyboard 65. The registration mode may be set in one of three registration modes I through III, i.e., registration mode I for registering voice reference patterns for voice recognition, registration mode II for registering voice patterns for voice synthesis and registration mode III for registering telephone (dial) numbers.

When a voice is input into the transmitter 61, its feature is extracted at the voice feature extractor 64 and it is either registered as a voice reference pattern in the reference pattern memories 68 and 70 or used for pattern matching at the pattern matching unit 67 under the control of the controller 66. If the reference pattern registration mode has not been set, this voice feature is supplied to the pattern matching unit 67 where it is compared with each of the reference voice patterns which have already been registered in the voice recognition reference pattern memory 68, whereby the one having the highest degree of similarity to the input voice pattern is selected as the result of voice recognition. This result of voice recognition is then supplied to the call placing circuit 72 which reads out the corresponding telephone number which has been registered previously in the telephone number memory 71 through the keyboard 65 and outputs a calling signal. On the other hand, the result of voice recognition is also supplied from the pattern matching unit 67 to the voice synthesizer 69 which reads out the corresponding voice reference pattern which has been registered in the voice synthesis reference pattern memory 70 and outputs a synthesized voice signal to the receiver 62.

Under the condition that the voice reference pattern registration mode has been set through the keyboard 65, when a voice is input into the transmitter 61, its voice feature is extracted by the voice feature extractor 64 and the thus extracted voice feature is registered into both of the voice recognition and voice synthesis reference pattern memories 68 and 70 at the same time. In addition, a corresponding telephone number is also input through the keyboard 65 using its numeric keys so that the corresponding telephone number is registered into the telephone number memory 71 in a unique relation with the corresponding voice pattern stored in the memories 68 and 70. Such a unique relationship may be stored in the controller 66 in the form of a table, though it may also be stored in any other desired format. The operation of inputting the telephone number using the numeric keys of the keyboard 65 corresponds to a dialing operation of the present apparatus when a call is placed, and thus the registration operation for registering a telephone number must be carried out in an off-hook condition or hang-up condition, in which a dialing signal is not transmitted to the network 74, but a call may be received to establish a telephone communication mode.

Figure 9:
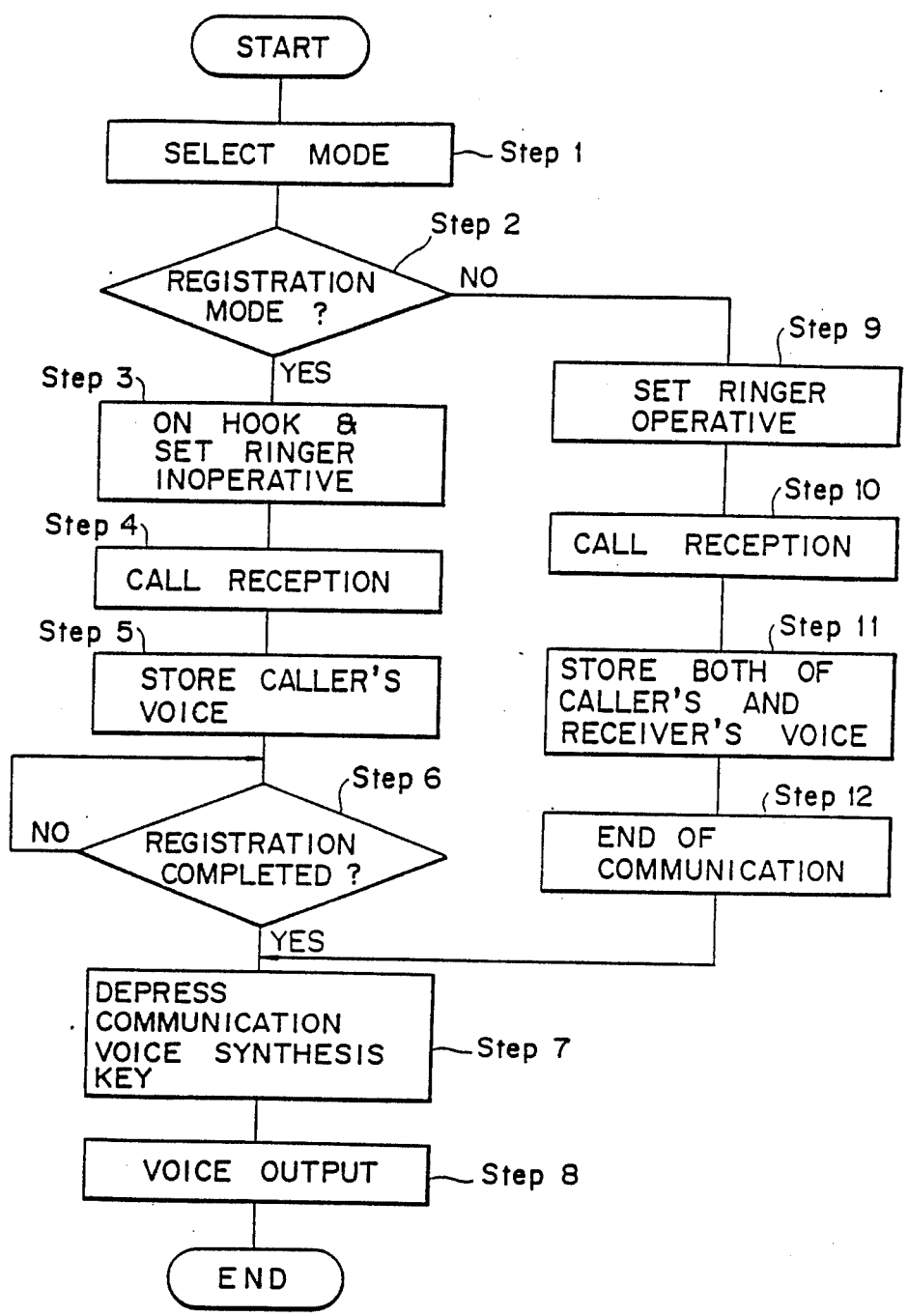
FIG. 9 is a flow chart which is useful for understanding the operation of the apparatus shown in FIG. 8.

Now, with particular reference to the flow chart shown in FIG. 9, the operation of the apparatus shown in FIG. 8 will be described in detail below. At step 1, a desired mode is selected by the user by operating the keyboard 65, and when the present apparatus is set in the registration mode at step 2, the network controller 73 sets the ringer of the present apparatus to be inoperative at step 3. Although not shown, as well known in the art, the ringer is a driver for driving a buzzer of a telephone unit to produce a sound to indicate that a call has been received. At the same time (step 3), the present apparatus is set in its off-hook state. It may be so structured that each of the three registration modes is set independently from each other or two or more modes may be set superposingly by operating the keyboard 65.

When a call has been received through the network 74 at step 4 while the present apparatus has been set in one or more of the registration modes as a result of the mode selection at step 1 or a registration operation is in progress at steps 2 and 3, a verbal communication transmitted from a caller through the network 74 is supplied to the voice feature extractor 64 to have its voice feature extracted and the thus extracted voice feature is stored into the voice synthesis reference pattern memory 70 at step 5. Thus, even if the present apparatus is in a registration mode, when a call has been received from an outside caller, its call is received and any message transmitted from the caller through the network 74 is once stored into the voice synthesis reference pattern memory 70 in the form of voice pattern data.

Upon completion of the registration operation at step 6, when a voice synthesis mode is established by depressing a communication voice synthesis key (not shown) provided in the keyboard 65 at step 7, the communication message stored in the voice synthesis voice reference pattern memory 70 in the form of voice patterns is read out and supplied to the voice synthesizer 69 which thus outputs a voice synthesis signal at step 8, which, in turn, is supplied to the receiver 62 to produce a corresponding audio signal. Thus, in accordance with the present invention, any communication message received from the caller while the present apparatus is operating in a registration mode, may be heard by the operator of the present apparatus upon completion of the registration operation.

Now, it will be described as to the case when the present apparatus is not in a registration mode when a call has been received from an outside caller through the network 74. At step 1, by operating the keyboard 65, when the present apparatus is set in a mode other than the registration mode at step 2, the network controller 73 sets the ringer to be operative at step 9. Under this condition, when a call has been received from an outside caller through the network 74 at step 10, a communication path is established between the caller and the operator of the present apparatus and communication messages of both of the caller and the receiver are supplied to the voice feature extractor 64 so that features of both of caller's and receiver's voices are stored into the voice synthesis reference pattern memory 70 at step 11. Then, upon completion of communication at step 12, when the keyboard 65 is operated to establish a communication reproduction mode by depressing the communication voice synthesis key at the keyboard 65 at step 7, the stored voice information is read out of the voice synthesis reference pattern memory 70 and supplied to the voice synthesizer 69 at step 8, which in turn outputs a synthesized voice signal to the receiver 62. As a result, in accordance with the present embodiment, after finishing a telephone conversation, since its entire contents are stored in the memory 70, it may be replayed by operating the keyboard 65 to rehear the conversation.

In the above-described embodiment, use has been made of a combination of a voice feature extractor, a voice memory and a voice synthesizer, and thus a voice is compressed when stored. Alternatively, use may also be made of any recording and reproducing device for recording and reproducing a voice signal as it is without compression, such as a tape or disc recorder. As described above, in accordance with this aspect of the present invention, there is provided a voice activated dialing apparatus in which a registration operation may be continuously carried out even if a call has been received from an outside caller during the registration operation while allowing to listen to any message received during the registration operation after completion of the registration operation. In addition, this aspect of the present invention provides a new function of rehearing any telephone conversation at any desired time after completion thereof.

In a voice activated dialing apparatus, a voice is normally input into the receiver of a handset of a telephone unit to produce a voice signal which is then processed in a predetermined manner to be finally stored in a memory typically in the form of a voice pattern. However, in such a typical voice activated dialing apparatus, the frequency bandwidth is limited to that of a commercial telephone unit, which normally ranges between 300 Hz and 3,4000 Hz. In such a case, the success rate of voice recognition tends to be limited. This aspect of the present invention is particularly addressed to solve this problem to thereby provide a voice activated dialing apparatus having a high voice recognition rate.

Figure 10:
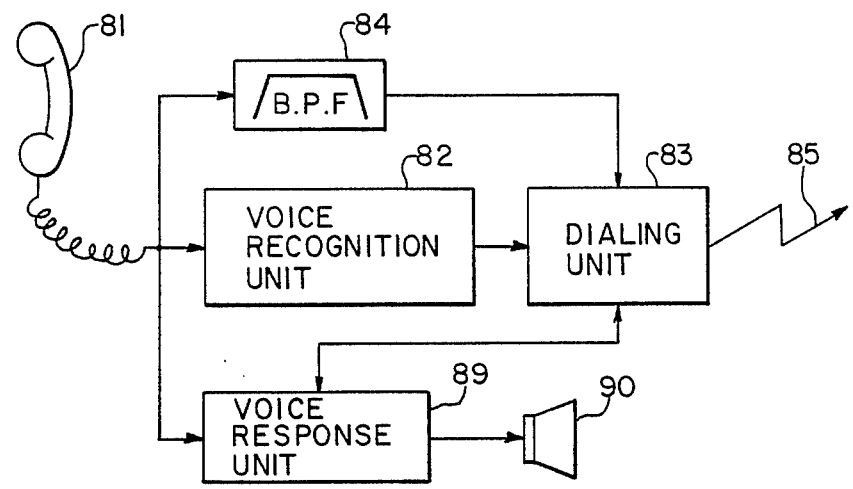
FIG. 10 is an illustration showing a voice activated automatic telephone number dialing apparatus constructed in accordance with a still further embodiment of the present invention.

FIG. 10 illustrates a voice activated dialing apparatus constructed in accordance with a still further embodiment of the present invention. As shown, the present apparatus includes a handset 81 containing therein a microphone having an extended audio frequency range. An output of the microphone contained in the handset 81 is supplied to a voice recognition unit 82 and also to a band pass filter 84. At the voice recognition unit 82, a predetermined feature, such as a time dependent frequency pattern, is extracted and the thus extracted feature or voice pattern is matched with each of a plurality of registered reference voice patterns in a library. Of importance, in the present apparatus, since the voice is sampled over an extended frequency range, the extraction of a feature or formation of a time dependent frequency pattern is carried out over an extended frequency range beyond the normal range of 300 to 3,400 Hz in a typical commercial telephone unit. In the present embodiment, the frequency range is set between 200 and 6,500 Hz and it has been found that an excellent voice recognition rate may be achieved with this bandwidth.

An output from the voice recognition unit 82 is supplied to a dialing unit or call placing unit 83 which outputs a predetermined calling signal in response to an output from the voice recognition unit 82. The dialing unit 83 is provided with a function for selecting a corresponding telephone number in response to the result of voice recognition at the voice recognition unit 82. Thus, when the voice recognition unit 82 determines that an input voice is "Smith", this result is supplied to the dialing unit 83 which then selects the Smith'telephone number. For this purpose, a memory may be preferably provided in the dialing unit 83 with a table which correlates a voice signal with a corresponding telephone number. The voice signal from the handset 81 is also supplied to the bandpass filter 84 where the voice signal is limited to the commercial telephone bandwidth. The bandpass filter 84 may be comprised of a passive element as well as an active element; however, the output impedance must be matched with the allowable range of the subscriber line 85. As a result, the voice signal to be transmitted to another telephone unit through the subscriber line 85 is limited to the commercial telephone bandwidth; on the other hand, a voice input for voice recognition has a wider bandwidth for achieving a higher recognition rate.

Accordingly, with the structure shown in FIG. 10, a voice input into the handset 81 is processed at the voice recognition unit 82 with an extended bandwidth so that the recognition of an identifier, such as the name of a subscriber, is carried out at high accuracy, and the recognized identifier is supplied to the dialing unit 83 which selects a corresponding telephone number and outputs a dialing signal to the intended subscriber through the subscriber line 85. In this case, the bandpass filter 84 provided in parallel with the voice recognition unit 82 is not connected to the subscriber line 85. Upon completion of outputting of a dialing signal to the subscriber line 85 from the dialing unit 83, the bandpass filter 84 is connected to the subscriber line 85 through the dialing unit 83 to thereby establish a normal telephone communication path through the handset 81, bandpass filter 84, dialing unit 83 and subscriber line 85, so that that portion of a voice input into the handset 81 which is limited to the normal telephone bandwidth by the bandpass filter 84 is transmitted to the subscriber line 85.

Figure 11:
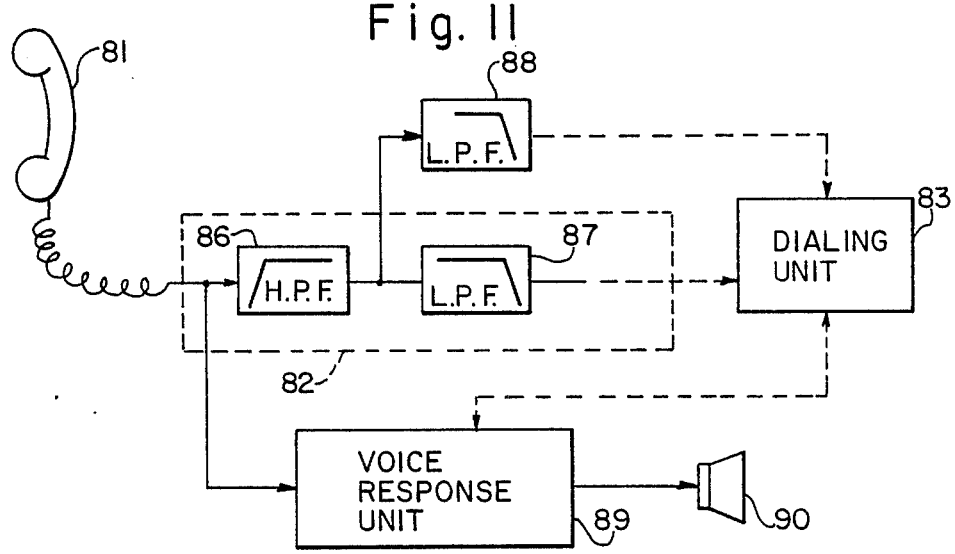
FIG. 11 is an illustration showing a voice activated automatic telephone number dialing apparatus which is a modification of the apparatus shown in FIG. 10.

FIG. 11 illustrates a modified voice activated dialing apparatus similar to the apparatus shown in Fig. 10. This apparatus is similar in many respects to the apparatus shown in FIG. 10 and the voice recognition unit 82 of this apparatus includes a high pass filter 86 and a low pass filter 87. The junction between the high pass filter 86 and the low pass filter 87 is connected to the input terminal of a low pass filter 88 having the commercial telephone bandwidth. In the structure of the present apparatus, the high cut-off frequency of the low pass filter 87 is set to be higher than that of the low pass filter 88 to permit to provide a high voice recognition rate for the voice recognition unit 82. These high and low pass filters 86, 87 and 88 may be normally comprised of active elements In such a case, in order to maintain the signal-to-noise ratio at a proper level, it is preferable to amplify the signal level to an appropriate level before processing. In this case, the low pass filter 88 is constructed to include a level shift unit for shifting the signal level to the level specified for a telephone unit.

In the above-described embodiments, the extended bandwidth has been applied only to voice recognition; however, such an extended bandwidth may also be applied to recording and reproducing of a voice response discussed in the previous embodiments. The use of such an extended bandwidth beyond that of the commercial telephone unit allows to record and reproduce a voice at higher quality.

Each of the apparatuses shown in FIGS. 10 and 11 includes a voice response unit 89 which has its input terminal connected to the handset 81. A voice output having an extended bandwidth is supplied from the handset 81 to the voice response unit 89 and recorded therein, and, in response to a control signal supplied from the dialing unit 83 which in turn is responsive to the output from the voice recognition unit 82, the voice response unit 89 supplies a voice signal to a loudspeaker 90 to produce a sound or voice.

Figure 12:
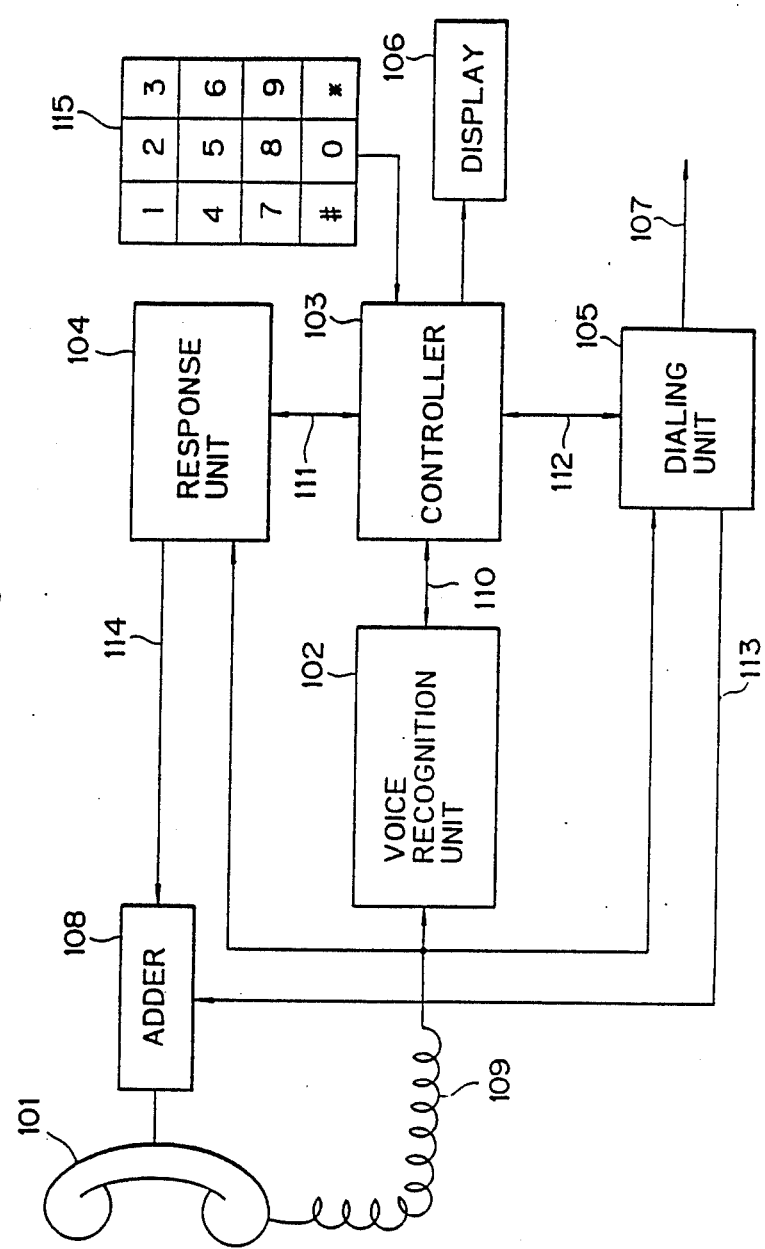
FIG. 12 is an illustration showing a voice activated automatic telephone number dialing apparatus constructed in accordance with a still further embodiment of the present invention.
Figure 13:
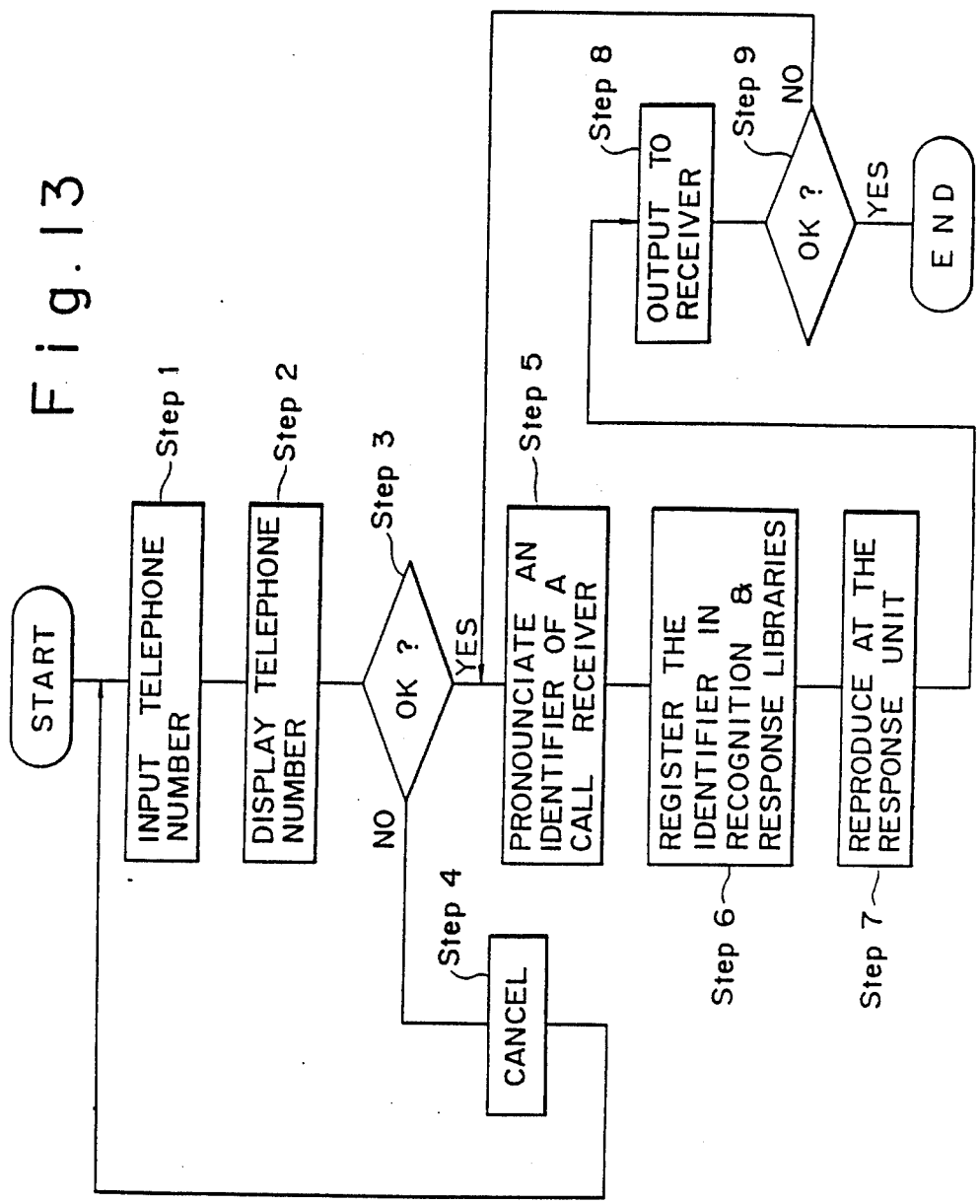
FIGS. 13 and 14 are flow charts which are useful for understanding the operation of the apparatus shown in FIG. 12.
Figure 14:
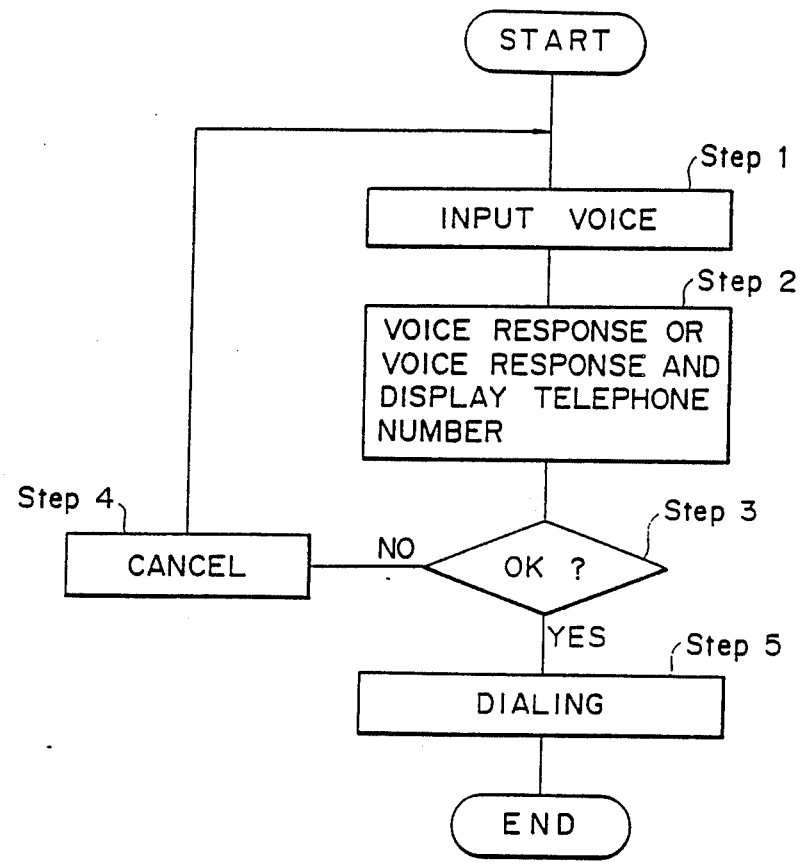

FIG. 12 illustrates a voice activated dialing apparatus constructed in accordance with a still further embodiment of the present invention and FIGS. 13 and 14 are flow charts which are useful for understanding the operation of the apparatus shown in FIG. 12. Briefly stated, in accordance with this aspect of the present invention, when an identifier, which is typically a name of a subscriber, of a telephone number of interest is to be pronounced so as to register the voice or pronunciation of the identifier in a voice pattern library for voice recognition, it is also registered in a voice pattern library for voice response at the same time. As shown in FIG. 12, the present apparatus includes a handset 101 provided with a transmitter and a receiver, a voice recognition unit 102, a controller 103, a response unit 104, a dialing unit 105 connectable to a subscriber line 107, a display unit 106, and an adder 108. With this structure, when a voice is input into the transmitter of the handset 101, its voice signal is created and supplied to the voice recognition unit 102 where the input voice is recognized by carrying out matching with a library of reference voice patterns which has previously been registered in the voice recognition unit to be used for voice recognition. And, the result of voice recognition is supplied to the voice response unit 104 through the controller 103 so that the voice response unit 104 supplies a voice response signal to the handset 101 to provide a voice response to the operator. At the same time, the result of voice recognition is also supplied to the display 106 through the controller 103 so that the result of voice recognition determined by the voice recognition unit 102 is displayed at the display 106.

Described more in detail, an output signal (voice signal) 109 from the handset 101 is supplied to the voice recognition unit 102, to the voice response unit 104 and also to the dialing unit 105. An output 110, which is the result of voice recognition, supplied from the voice recognition unit 102 is input into the controller 103, and, thus, under the control of the controller 103, the result of voice recognition is displayed at the display 106. At the same time, the controller 103 supplies control signals 111 and 112 to the voice response unit 104 and the dialing unit 105, respectively. In response to the control signal 111, the voice response unit 104 supplies a voice response signal 114 to one input terminal of the adder 108. On the other hand, a communication signal transmitted through the subscriber line 107 and the dialing unit 105 is input into another input terminal of the adder 108 through a connection line 113. And, an output of this adder 108 is supplied to the receiver of the handset 101. Also provided is a collection of input keys 115, including numeric keys "0" through "9" and symbolic keys "#" and "*", which is operatively connected to the controller 103. These input keys 115 are to be used for inputting each of the digits of a telephone (dial) number of interest.

FIG. 13 is a flow chart showing a sequence of steps of a registration operation to be carried out with the apparatus shown in FIG. 12. In the first place, a telephone (dial or facsimile) number of interest is input by using the input keys 115 and the thus input telephone number is immediately displayed at the display 106. Observing the information displayed at the display 106, the operator determines whether the input data is correct or not. If incorrect, the operator cancels the input data, for example, by pushing either one of symbolic keys "#" and "*." If correct, any desired voice, which is to be used as an identifier of the telephone number just input and thus is typically the name of its subscriber, is produced over a predetermined number of times repetitively and input into the transmitter of the handset 101. And thus an average voice pattern of the repetitively input voice signals is created and registered in a voice recognition library memory provided in the voice recognition unit 102. At the same time, these voice inputs are also supplied to the voice response unit 104 and similarly an average voice pattern is created and registered in a voice response library memory provided in the voice response unit 104. It is to be noted that any desired voice recording and reproducing scheme may be used in the voice response unit 104. For example, use may be made of a system for directly recording and reproducing a voice signal, or, alternatively, use may also be made of a system for extracting a feature of a voice and recording such a feature. In response to the control signal 111, the voice response unit 104 supplies a voice signal corresponding to the result of voice recognition determined by the voice recognition unit 102 to the adder 108 through an interconnection line 114.

FIG. 14 illustrates a flow chart showing a sequence of steps of a normal operation of the apparatus shown in FIG. 12. As illustrated, when the operator picks up the handset 101 and inputs a verbal message, such as "Smith", into the transmitter of the handset 101. Then, this voice input is analyzed by the voice recognition unit 102, and in response to the result of voice recognition from the voice recognition unit 102, the voice response unit 104 supplies a corresponding voice signal for "Smith", which has been registered at the same time when "Smith" has been registered in the memory of the voice recognition unit 102, to the receiver of the handset 101. As a result, the operator receives a voice response of "Smith" in response to his or her voice input and thus the operator can determine the correctness of the input data. At the same time, the corresponding telephone number is displayed at the display 106. If the operator is satisfied with the voice response and the displayed telephone number, then the operator gives an "OK" signal to the apparatus, for example, by saying "OK" to the transmitter of the handset 101 or by depressing one or both of the symbolic keys "#" and "*" depending on a predetermined procedure. If this OK signal has been supplied, the apparatus enters into a dialing operation. If the voice response is not correct, then the operator cancels the input and starts a series of steps all over again. In the above-described embodiment, the telephone number is displayed upon completion of recognition of a voice input; however, the display of the corresponding telephone number is not essential in this aspect of the present invention, though its provision is preferable, and thus the display 106 may be discarded, if desired In this manner, in accordance with this aspect of the present invention, it is not necessary to remember the telephone number and it is only necessary to remember the identifier, such as the name of a subscriber, in placing a call.

FIG. 15 shows in block form a voice activated dialing apparatus constructed in accordance with a still further embodiment of the present invention, which permits the operator to select whether an operational guidance is to be given verbally by reproducing recorded messages or not. As shown in FIG. 15, the present apparatus includes a transmitter 121, a receiver 122, a communication circuit 123, a hook switch 124, a voice feature extractor 125, a keyboard 126, a guidance selector 127, a first voice reference pattern memory 128, a second voice reference pattern memory 129, a pattern matching unit 130, a voice synthesizer 131, a third voice reference pattern memory 132, a telephone number memory 133, a call placing circuit 134, and a network controller 135 which is connected to a network 136. The transmitter 121, receiver 122, communication circuit 123 and hook switch 124 may be constructed by those used in an ordinary telephone unit and the transmitter 121 and receiver 122 are typically incorporated in a handset. The network controller 135 may be comprised of a simple turn-over switch which connects the network 136 to the communication circuit 123 upon receipt of a call from an outside caller or after outputting a dialing signal for providing a communication path and to the call placing circuit 134 other than that.

In a registration mode, when a voice is input into the transmitter 121, its feature, such as a time-frequency or time-dependent frequency distribution voice pattern, is extracted at the voice feature extractor 125. This voice feature or voice pattern is then registered in the first voice reference pattern memory 128 as a voice reference pattern. The same voice feature may also be registered in the second voice reference pattern memory 129. In the illustrated embodiment, the first voice reference pattern memory 128 is used for voice recognition operation and the second voice reference pattern memory 129 is used for synthesis of a voice signal. At the same time, a telephone or dial number which corresponds to the voice input is input through the keyboard 126 and registered in the telephone number memory 133. In this manner, as many telephone numbers and associated voice data as desired may be registered in the apparatus.

In the present apparatus, the third voice reference pattern memory 132 is also provided and predetermined guidance messages are recorded therein. The memory 132 may be comprised of a ROM if the data stored therein is not expected to be altered later. It is to be noted that any other voice recording and reproducing element or device may be used for the memory 132. Also provided in the present apparatus is the guidance selector 127 which may have either one of two states, i.e., guidance enable state and guidance disable state. When the guidance selector 127 is set to its guidance enable state, the guidance data stored in the memory 132 is supplied to the voice synthesizer 131 which in turn supplies a voice signal to the receiver 122 to provide a verbal guidance to the operator. On the other hand, when the guidance selector 127 is set to its guidance disable state, no verbal guidance information is supplied to the operator.

Now, let us assume that the operator needs guidance information in carrying out a registration operation of the present apparatus and thus the guidance selector 127 is set in its guidance enable state. When a registration operation is to be implemented, the operator first operates the keyboard 126 to set the present apparatus in the registration mode. When the registration mode has been set with the guidance selector 127 set in its guidance enable state, the voice synthesizer 131 reads out appropriate data from the memory 132 and supplies a voice signal to the receiver 122 to thereby provide guidance information verbally. In this manner, the operator takes action in accordance with this verbal guidance one step at a time. As a result, the operator may complete the registration operation without consulting a manual.

If the operator becomes experienced with this registration operation and can carry out a registration operation without the aid of verbal guidance information, then the operator sets the guidance selector 127 in its guidance disable state by operating the keyboard 126. Thus, the experienced operator can carry out a registration operation without waiting for each of verbal guidance to be completed. It is to be noted that a procedure of any other operation other than registration operation may also be stored in the memory 132. In addition, it may also be so structured that the state of the guidance selector 127 may be set in response to a voice input instead of a key input through the keyboard 126.

The normal operation of the present apparatus is similar to those of the previously described embodiments. That is, when a voice is input into the transmitter 121, its feature is extracted at the voice feature extractor 125 and its extracted feature is supplied to the pattern matching unit 130 where the voice feature of the input voice is compared with each of the reference voice features registered in the memory 128 and the one having the highest degree of similarity is selected as a recognized result. This result of recognition is supplied to the telephone number memory 133 which supplies a corresponding telephone number to the call placing circuit 134, which, in turn, sends out a calling signal to the network 136 through the network controller 135. If desired, the result of recognition is also supplied from the matching unit 130 to the voice synthesizer 131 which then reads out the corresponding voice data and supplies a voice signal to the receiver 122 which in turn produces a voice signal. In this case, the operator can check whether or not the result of voice recognition agrees with the input voice, and, thus, it may be so structured that the call placing circuit 134 sends out a dialing signal after the operator has input a confirmation signal a described before.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A voice activated dialing apparatus, comprising:
   first storing means for storing a plurality of telephone numbers;
   second storing means for storing a plurality of voice data, each of which corresponds to one of said plurality of telephone numbers;
   generating means for generating voices in accordance with at least one of said plurality of voice date stored in said second storing means;
   first selecting means for selecting at least one of said plurality of voice data stored in said second storing means to be supplied to said generating means for generating a voice of each of said selected voice data;
   second selecting means for selecting one voice data among said selected voice data while said selected voice date is used by said generating means to generate voices one after another; and
   outputting means for outputting a dial signal of a telephone number which corresponds to said one voice data selected by said second selecting means.

2. Apparatus of claim 1, wherein said plurality of voice data are classified into a predetermined number of groups and said first selecting means selects one of said groups.

3. Apparatus of claim 1, wherein said one voice data selected by said second selecting means is supplied to said generating means to generate a voice, and said outputting means outputs said dial signal in response to confirmation made by an operator of the voice thus generated by said generating means after selection.

4. A voice activated dialing apparatus, comprising:
   first storing means for storing a plurality of telephone numbers;
   first inputting means for manually inputting a telephone number in said first storing means;
   second storing means for storing a plurality of voice data, each of which corresponds to one of said plurality of telephone numbers;
   second inputting means for inputting a voice data in said second storing means in response to a voice pronounced by an operator;
   generating means for generating a voice in accordance with at least one of said plurality of voice data stored in said second storing means; and
   controlling means for controlling a mode of operation of said apparatus, said controlling means terminating any other operation which is being performed by said first and/or second inputting means than a telephone communication operation upon receipt of a call from an outside caller.

5. Apparatus of claim 4, further comprising third storing means for storing a status of said apparatus when the operation is terminated by said controlling means, and wherein said controlling means restores the status upon completion of the telephone communication operation.

6. A voice activated dialing apparatus having at least a registration mode and a communication mode as modes of operation, comprising:
   first storing means for storing a plurality of telephone numbers;
   first inputting means for manually inputting a telephone number in said first storing means while said apparatus is in said registration mode;
   second storing means for storing a plurality of voice data, each of which corresponds to one of said plurality of telephone numbers;
   third storing means for storing at least one voice data without relation to said plurality of telephone numbers;
   second inputting means for inputting a voice data in at least one of said second storing means and said third storing means in response to a voice pronounced by an operator;
   generating means for generating a voice in accordance with at least one of said voice data stored in said second storing means and said third storing means; and
   controlling means for controlling a mode of operation of said apparatus such that when a call has been received while said apparatus is in said registration mode, any message sent from a caller is stored in said third storing means, and, after completion of said registration mode, said message stored in said third storing means is generated as a voice message by said generating means.

7. Apparatus of claim 6, wherein said message stored in said third storing means is generated as a voice message by said generating means in response to a start signal input by an operator.

8. Apparatus of claim 7, wherein said first inputting means includes a keyboard provided with a plurality of input keys, and said start signal is created by depressing at least one of said input keys.

9. Apparatus of claim 6, wherein said second inputting means includes a telephone transmitter.

10. Apparatus of claim 9, wherein said telephone transmitter includes a microphone.

11. A voice activated dialing apparatus having at least a registration mode and a communication mode as modes of operation, comprising:
   first storing means for storing a plurality of telephone numbers;
   first inputting means for manually inputting a telephone number in said first storing means while said apparatus is in said registration mode;
   second storing means for storing a plurality of voice data, each of which corresponds to one of said plurality of telephone numbers;
   third storing means for storing at least one voice data without relation to said plurality of telephone numbers;
   second inputting means for inputting a voice data in at least one of said second storing means and said third storing means in response to a voice pronounced by an operator;
   generating means for generating a voice in accordance with at least one of said voice data stored in said second storing means and said third storing means; and
   controlling means for controlling a mode of operation of said apparatus such that when a call has been received while said apparatus is not in said registration mode, both of messages sent from a caller and generated by an operator of said apparatus through said generating means are stored in said third storing means, and, after completion of communication, said messages stored in said third storing means are generated as voice messages by said generating means.

12. Apparatus of claim 11, wherein said messages stored in said third storing means are generated as voice messages by said generating means in response to a start signal input by said operator.

13. Apparatus of claim 12, wherein said first inputting means includes a keyboard provided with a plurality of input keys, and said start signal is created by depressing at least one of said input keys.

14. Apparatus of claim 11, wherein said second inputting means includes a telephone transmitter.

15. A voice activated dialing apparatus, comprising:
   a handset including a transmitter having a broader bandwidth than that of a commercial telephone bandwidth and a receiver;
   voice recognition means for recognizing a voice signal supplied from said transmitter, wherein said voice recognition means includes a high pass filter and a first low pass filter connected to said high pass filter, wherein a combined bandwidth defined by a lower frequency limit of said high pass filter and an upper frequency limit of said first low pass filter is broader than the commercial telephone bandwidth, and further comprising a second low pass filter connected between a junction between said high and first low pass filters and said outputting means, whereby an upper frequency limit of said second low pass filter corresponds to an upper frequency limit of the commercial telephone bandwidth; and
   outputting means responsive to said voice recognition means for outputting a telephone number which corresponds to a result of voice recognition supplied from said voice recognition means to an external network.

16. A voice actuated dialing apparatus having a normal mode without operational guidance assistance and an assisted mode with operational guidance, comprising:
   a handset including a transmitter for converting a voice in the form of pressure waves into a voice electrical signal and a receiver for converting a voice electrical signal into a voice in the form of pressure waves, said handset being connectable to an external network;
   a telephone number memory for storing a plurality of telephone numbers;
   inputting means for manually inputting a telephone number in said telephone number memory;
   a voice memory operatively coupled to said handset for storing a collection of voice data, each of at least some of which corresponds to one of said plurality of telephone numbers stored in said telephone number memory, whereby said voice data may be supplied to said receiver to produce a corresponding voice in the form of pressure waves;
   outputting means for outputting a dial signal of one of said plurality of telephone numbers to said external network in response to a voice input into said transmitter by said operator;
   a guidance memory for storing a set of predetermined guidance data, which may be supplied to said receiver to produce verbal guidance information to the operator; and
   selecting means for selecting a mode of operation of said apparatus between said normal mode and said assisted mode, whereby said guidance memory is operatively coupled to said receiver when said assisted mode has been selected and operatively decoupled when said normal mode has been selected.

17. Apparatus of claim 16, wherein said guidance information is supplied one step at a time in a procedure including a plurality of steps.

* * * * *